(12) United States Patent
Shen et al.

(10) Patent No.: US 12,074,816 B2
(45) Date of Patent: Aug. 27, 2024

(54) METHOD AND APPARATUS FOR REFERENCE SIGNAL TRANSMISSION

(71) Applicant: HUAWEI TECHNOLOGIES CO., LTD., Guangdong (CN)

(72) Inventors: Zukang Shen, Beijing (CN); Yongqiang Fei, Shenzhen (CN); Yi Long, Beijing (CN); Zhiheng Guo, Beijing (CN); Xinqian Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 17/402,069

(22) Filed: Aug. 13, 2021

(65) Prior Publication Data

US 2021/0376981 A1     Dec. 2, 2021

Related U.S. Application Data

(63) Continuation of application No. PCT/CN2020/073644, filed on Jan. 21, 2020.

(30) Foreign Application Priority Data

Feb. 15, 2019    (CN) .......................... 201910118041.3

(51) Int. Cl.
*H04W 72/04*     (2023.01)
*H04L 5/00*     (2006.01)
(Continued)

(52) U.S. Cl.
CPC ....... *H04L 5/0048* (2013.01); *H04W 72/0446* (2013.01); *H04W 72/1263* (2013.01)

(58) Field of Classification Search
CPC ... H04L 5/0048; H04L 5/0092; H04L 5/0007; H04L 1/08; H04L 5/0094; H04W 72/0446; H04W 72/1263; H04B 17/345
(Continued)

(56) References Cited

U.S. PATENT DOCUMENTS

2016/0308647 A1    10/2016   Kwak et al.

FOREIGN PATENT DOCUMENTS

CN    104521294 A    4/2015
CN    104981989 A    10/2015
(Continued)

OTHER PUBLICATIONS

CATT (R1-1900329, On RIM RS Design, Taipei, Jan. 21-25, 2019) (Year: 2019).*
(Continued)

*Primary Examiner* — Maharishi V Khirodhar
(74) *Attorney, Agent, or Firm* — WOMBLE BOND DICKINSON (US) LLP

(57) ABSTRACT

A communication method and a communications apparatus are provided, to resolve a problem of how to send and receive a remote interference management reference signal (RIM-RS) during remote interference measurement. The method includes determining a transmission resource of a reference signal based on identification information and parameter information, where the transmission resource includes one or more of a sequence, a frequency domain resource, and a time domain resource of the reference signal, the identification information is used to identify a network device, the parameter information includes sequence indication information and frequency domain indication information, the sequence indication information is used to indicate one or more candidate sequences, and the frequency domain indication information is used to indicate one or (Continued)

more candidate frequency domain resources. The method may further include sending the reference signal on the transmission resource.

24 Claims, 16 Drawing Sheets

(51) Int. Cl.
　　　*H04W 72/0446*　　(2023.01)
　　　*H04W 72/1263*　　(2023.01)
　　　*H04W 76/00*　　　(2018.01)
　　　*H04W 88/08*　　　(2009.01)
(58) Field of Classification Search
　　　USPC .......................................................... 370/329
　　　See application file for complete search history.

(56) References Cited

FOREIGN PATENT DOCUMENTS

| | | |
|---|---|---|
| CN | 108933648 A | 12/2018 |
| RU | 2673800 C1 | 11/2018 |
| WO | 2018174811 A1 | 9/2018 |

OTHER PUBLICATIONS

Qualcomm (R1- 1900894, Taipei, Jan. 21-25, 2019) (Year: 2019).*
Intel corporation (R1-1900492, OAM functions to support RIM operation, Taipei, Jan. 21-25, 2019). (Year: 2019).*
ZTE (R1-1900224, discussion on OAM functions to support RIM operations, Taipei, Jan. 21-25, 2019), (Year: 2019).*
Ericsson (R1-1900760, on RIM RS resource and configurations, Taipei, Jan. 21-25, 2019 ) (Year: 2019).*
Intel corporation (R1-1900491, RIM-RS design, Taipei, Jan. 21-25, 2019) (Year: 2019).*
Samsung (R1- 1901065, RIM RS resource configuration, Taipei, Jan. 21-25, 2019) (Year: 2019).*
Nokia (R1-1900838, Discussion on RIM-RS configuration, Taipei, Jan. 21-25, 2019), (Year: 2019).*
Nokia, Nokia Shanghai Bell, Discussion on RIM-RS configurations. 3GPP TSG RAN WG1 Ad-Hoc Meeting 1901, Taipei, Taiwan, Jan. 21-25, 2019, R1-1900838, 12 pages.
Wei Hai yan et al: "A method of rapid transmission on ISM band for LTE system",Mar. 2013, Total 6 pages.
Xiao Han et al: "Resource Allocation Schemes for theHeterogeneous OFDMA System with MultipleAd Hoc Relays",Jan. 2013, Total 6 pages.
3GPP TSG RAN WG1 Meeting #96, R1-1901547, Discussion on RIM-RS configuration, Huawei, HiSilicon, Athens, Greece, Feb. 25 Mar. 1, 2019, total 11 pages.
3GPP TS 38.211 V15.4.0 (Dec. 2018), 3rd Generation Partnership Project; Technical Specification Group Radio Access Network; NR; Physical channels and modulation(Release 15), 96 pages.
3GPP TSG RAN WG1 Meeting Ad-Hoc Meeting 1901, R1-1900760,On RIM RS resource and configurations , Ericsson, Taipei, Taiwan, Jan. 21-25, 2019, total 11 pages.
3GPP TSG RAN WG1 Meeting #94, R1-1808068, Discussion on reference signal design for identifying remote interference, Huawei, HiSilicon, Gothenburg, Sweden, Aug. 20 24, 2018, total 5 pages.
3GPP TSG RAN WG1 Ad-Hoc Meeting 1901, R1-1900410, Discussion on configuration of RIM RS, Taipei, Jan. 21 25, 2019, CMCC,, total 15 pages.
3GPP TSG RAN WG1 Meeting #94bis, R1-1810149, Discussion on reference signal design for identifying remote interference, Huawei, HiSilicon, Chengdu, China, Oct. 8 12, 2018, total 8 pages.
3GPP TSG RAN WG1 Meeting #95,R1-1812217,Discussion on reference signal design for identifying remote interference, Huawei, HiSilicon, Spokane, USA, Nov. 12 16, 2018, total 11 pages.
3GPP TSG RAN WG1 Ad-Hoc Meeting 1901, R1-1900051, Discussion on RS design for RIM purpose, Huawei, HiSilicon, Taipei, Jan. 21 25, 2019, total 5 pages.
3GPP TSG RAN Meeting #79, RP-180311,Study on Remote Interference Management in NR , CMCC, Chennai, India, Mar. 19-22, 2018, total 4 pages.

* cited by examiner

METHOD AND APPARATUS FOR REFERENCE SIGNAL TRANSMISSION

CROSS-REFERENCE TO RELATED APPLICATIONS

This application is a continuation of International Application No. PCT/CN2020/073644, filed on Jan. 21, 2020, which claims priority to Chinese Patent Application No. 201910118041.3, filed on Feb. 15, 2019. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

In a wireless communications system in which time division duplex (TDD) is used, for example, in a new radio (NR) communications system, cross-link interference (CLI) may be generated between two network devices working at a same frequency. The cross-link interference refers to interference caused by a downlink (DL) signal sent by one network device to an uplink (UL) signal received by another network device. An atmospheric duct effect enables a DL signal, sent by a network device, to be transmitted over a long distance, and this is one of causes of the CLI. As shown in FIG. 1, for example, a network device is a base station, and two network devices are represented by a base station 1 and a base station 2. The base station 1 and the base station 2 are geographically far away from each other. Even though the two base stations have a same transmission direction (to be specific, they receive uplink signals simultaneously/send downlink signals simultaneously), there is an obvious delay when a downlink signal sent by the base station 1 arrives at the base station 2. The delay is greater than a guard period (GP) of uplink-downlink switching of the base station 2, and the base station 2 has switched from a downlink sending direction to an uplink receiving direction. Therefore, the downlink signal sent by the remote base station 1 interferes with an uplink signal received by the local base station 2, that is, remote interference (RI) is generated.

For interference caused by an atmospheric duct, an interference distance and a delay are affected by a geographical location and weather. Therefore, the interference distance and the delay hold great uncertainties. To resist the remote interference, methods such as reducing a transmit power by using an interfering base station, and reducing a quantity of transmitted downlink symbols by an interfering base station are used. However, before implementing an interference reduction solution, inter-base station measurement needs to be performed, to identify existence of the remote interference, or identify an interfering base station. Currently, the cross-link interference is usually detected by receiving and sending a reference signal (RS). A reference signal used for measuring the remote interference may be referred to as a remote interference management reference signal (RIM-RS). In this process, if an interfering base station sends a RIM-RS, an interfered base station may identify, by receiving or detecting the RIM-RS, the base station that sends the RIM-RS, or if an interfered base station sends a RIM-RS, an interfering base station may identify, by receiving or detecting the RIM-RS, the base station that sends the RIM-RS.

However, how to send and receive a RIM-RS is a problem that needs to be resolved.

SUMMARY

Embodiments of this application provide a communication method and a communications apparatus, to resolve a problem of how to send and receive a RIM-RS during remote interference measurement.

Specific technical solutions provided in the embodiments of this application are as follows.

According to a first aspect, a communication method is provided. The method may be performed by a first network device. The method is implemented by performing the following steps: determining a transmission resource of a reference signal based on identification information and parameter information, where the transmission resource includes one or more of a sequence, a frequency domain resource, and a time domain resource of the reference signal, the identification information is used to identify a network device, the parameter information includes sequence indication information and frequency domain indication information, the sequence indication information is used to indicate one or more candidate sequences, and the frequency domain indication information is used to indicate one or more candidate frequency domain resources; and sending the reference signal on the transmission resource. According to the method, the first network device may determine, based on the identification information and the parameter information, a sequence and a time-frequency resource for sending the reference signal, to send the reference signal, thereby improving effectiveness of performing interference coordination between network devices.

In a possible embodiment, the identification information and the parameter information are information configured by a higher-level node or operation, administration and maintenance OAM.

In a possible embodiment, the sequence of the reference signal corresponding to the identification information is determined from the candidate sequences; and/or, the frequency domain resource corresponding to the identification information is determined from the candidate frequency domain resources; and/or, the time domain resource is determined based on the identification information. According to the design of the reference signal in this application, under various network configurations and detection requirements, the reference signal can be flexibly sent and received when remote interference measurement is performed between the network devices. For example, a requirement for a quantity of RIM-RS sequences in NR may vary with a quantity of gNBs deployed by an operator. For example, when the quantity of the gNBs is relatively small, the quantity of the RIM-RS sequences may be reduced, thereby reducing detection complexity and improving a detection probability. In NR, in a frequency band below 6 GHz, NR may support a maximum bandwidth of 100 MHz. In a bandwidth of an NR system, a plurality of RIM-RSs may be transmitted at different frequency domain positions, in other words, frequency division transmission is performed. The foregoing method can support the frequency division transmission.

In a possible embodiment, the time domain resource may be a time unit. The time domain resource or the time unit includes one or more uplink-downlink switching periods. The parameter information further includes one or more of first indication information, second indication information, or third indication information. The first indication information is used to indicate a quantity of times of repeatedly sending the reference signal. The second indication information is used to indicate a position, of a symbol that carries the reference signal, in an uplink-downlink switching period. The third indication information is used to indicate an uplink-downlink switching period that is used for carrying the reference signal and that is in a first uplink-downlink switching period and a second uplink-downlink switching period. The first uplink-downlink switching period and the second uplink-downlink switching period are adjacent in time domain, and the first uplink-downlink switching period and the second uplink-downlink switching period have different patterns. As the reference signal is flexibly configured, requirements for different quantities of reference signal sequences and different network bandwidths can be met. In addition, the reference signal can be configured according to different repetition enhancement requirements and detection distance requirements, so that network devices in networks with different deployment characteristics can perform remote interference measurement. For example, the configuration of the reference signal can be applied to a scenario in which quantities of gNBs deployed by different operators in NR may range from tens of thousands to millions.

In a possible embodiment, that the sequence of the reference signal corresponding to the identification information is determined from the candidate sequences is implemented in the following manner: determining sequence index information corresponding to the identification information; and determining, from the candidate sequences, the sequence of the reference signal corresponding to the sequence index information.

In a possible embodiment, that the frequency domain resource corresponding to the identification information is determined from the candidate frequency domain resources is implemented in the following manner: determining frequency domain index information corresponding to the identification information; and determining, from the candidate frequency domain resources, the frequency domain resource corresponding to the frequency domain index information.

In a possible embodiment, that the time domain resource is determined based on the identification information is implemented in the following manner: determining time domain index information corresponding to the identification information; and determining the time domain resource that corresponds to the time domain index information in a period indicated by period indication information, where the period indication information is used to indicate a period of sending the reference signal.

In a possible embodiment, that the time domain resource is determined based on the identification information is implemented in the following manner: determining a period of the reference signal based on the identification information, the sequence indication information, and the frequency domain indication information; determining time domain index information corresponding to the identification information; and determining the time domain resource that corresponds to the time domain index information in the period.

In a possible embodiment, a bit at a first specified position in the time domain index information is determined by reference signal distinguishing information. In this way, two reference signal types may be distinguished in a time division manner.

In a possible embodiment, the identification information includes first identification information and second identification information. The time domain index information includes first time domain index information and second time domain index information. The first identification information corresponds to the first time domain index information, and the second identification information corresponds to the second time domain index information. This helps implement more accurate inter-base station interference coordination.

In a possible embodiment, the time domain resource includes a first time domain resource and a second time domain resource. The time domain resource may be determined in the following manner: determining the first time domain resource in the period based on the first time domain index information, and/or determining the second time domain resource in the period based on the second time domain index information. This helps implement more accurate inter-base station interference coordination.

In a possible embodiment, the time domain resource includes a first time domain resource and a second time domain resource. The time domain resource may be determined in the following manner: determining the first time domain resource in the period based on the first time domain index information and a first offset, and/or determining the second time domain resource in the period based on the second time domain index information and a second offset. In this way, the first identification information only needs to indicate a time domain position in a first sub-period, and the first sub-period is usually less than an entire transmission period. Therefore, compared with a case in which the first identification information needs to indicate time domain positions in the entire transmission period, a relatively small number of bits are needed, and signaling overheads can be reduced. The second identification information only needs to indicate a time domain position in a second sub-period, and the second sub-period is usually less than the entire transmission period. Therefore, compared with a case in which the second identification information needs to indicate the time domain positions in the entire transmission period, a relatively small number of bits are needed, and the signaling overheads can be reduced.

In a possible embodiment, the first offset is determined by the second sub-period, and/or the second offset is determined by the first sub-period.

In a possible embodiment, a bit at a second specified position in the sequence index information is determined by interference cancellation state indication information. In this way, two interference cancellation states may be distinguished in a code division manner.

In a possible embodiment, the identification information includes first identification information and second identification information. The sequence index information includes first sequence index information and second sequence index information. The first identification information corresponds to the first sequence index information, and the second identification information corresponds to the second sequence index information. This helps implement more accurate inter-base station interference coordination.

In a possible embodiment, the first index information is used to indicate that interference cancellation used by an interfering base station is sufficient; and the second index information is used to indicate that the interference cancellation used by the interfering station is insufficient. This helps implement more accurate inter-base station interference coordination.

In a possible embodiment, the identification information includes third identification information and fourth identification information, and the sequence index information includes first sequence index information and second sequence index information. The first identification information corresponds to the first time domain index information and the first sequence index information, the second identification information corresponds to the second time domain index information and the first sequence index information, the third identification information corresponds to the first time domain index information and the second sequence index information, and the fourth identification information corresponds to the second time domain index information and the second sequence index information. This helps implement more accurate inter-base station interference coordination.

In a possible embodiment, the identification information includes third identification information, and the sequence index information includes first sequence index information and second sequence index information. The first identification information corresponds to the first time domain index information and the first sequence index information, the second identification information corresponds to the second time domain index information, and the third identification information corresponds to the first time domain index information and the second sequence index information. This helps implement more accurate inter-base station interference coordination.

In a possible embodiment, the sequence includes a first sequence and a second sequence. The sequence of the reference signal is determined in the following manner: determining, from the candidate sequences based on the first sequence index information, the first sequence corresponding to the first sequence index information, and/or determining, from the candidate sequences based on the second sequence index information, the second sequence corresponding to the second sequence index information. This helps implement more accurate inter-base station interference coordination.

In a possible embodiment, the sequence includes a first sequence and a second sequence. The sequence of the reference signal is determined in the following manner: determining, from the candidate sequences based on the first sequence index information and a third offset, the first sequence corresponding to the first sequence index information, and/or determining, from the candidate sequences based on the second sequence index information and a fourth offset, the second sequence corresponding to the second sequence index information. In this way, the first identification information only needs to indicate a sequence in a sequence resource in a first range, and the sequence resource in the first range is usually less than an entire sequence resource. Therefore, compared with a case in which the first identification information needs to indicate a sequence in the entire sequence resource, a relatively small number of bits are needed, and the signaling overheads can be reduced. The second identification information only needs to indicate a sequence in a sequence resource in a second range, and the sequence resource in the second range is usually less than the entire sequence resource. Therefore, compared with a case in which the second identification information needs to indicate a sequence in the entire sequence resource, a relatively small number of bits are needed, and the signaling overheads can be reduced.

According to a second aspect, a communication method is provided. The method may be performed by a receiving end, for example, a second network device. The method is implemented by performing the following steps: determining a receiving resource based on parameter information, where the parameter information includes sequence indication information and frequency domain indication information, the sequence indication information is used to indicate one or more candidate sequences, and the frequency domain indication information is used to indicate one or more candidate frequency domain resources; and receiving a reference signal on the receiving resource. The parameter information is applicable to both a first network device and the second network device. The second network device may perform receiving or detection in candidate time-frequency resources and a sequence set based on the parameter information, and determine, based on detected sequence and time-frequency resources of the reference signal, identification information of the first network device that sends the reference signal, to receive the reference signal. This helps improve effectiveness of performing interference coordination between network devices.

In a possible embodiment, the method further includes: determining a transmission resource of the reference signal, where the transmission resource includes one or more of a sequence, a frequency domain resource, and a time domain resource that correspond to the reference signal; and determining identification information of the reference signal based on the transmission resource of the reference signal, where the identification information is used to identify a network device that sends the reference signal. According to the design of the reference signal in this application, under various different network configurations and detection requirements, the reference signal can be flexibly sent and received when remote interference measurement is performed between the network devices. For example, a requirement for a quantity of RIM-RS sequences in NR may vary with a quantity of gNBs deployed by an operator. For example, when the quantity of the gNBs is relatively small, the quantity of the RIM-RS sequences may be reduced, thereby reducing detection complexity and improving a detection probability. In NR, in a frequency band below 6 GHz, NR may support a maximum bandwidth of 100 MHz. In a bandwidth of an NR system, a plurality of RIM-RSs may be transmitted at different frequency domain positions, in other words, frequency division transmission is performed. The foregoing method can support the frequency division transmission.

In a possible embodiment, the determining identification information based on the transmission resource of the reference signal is implemented in the following manner: determining sequence index information based on the sequence of the reference signal, determining frequency domain index information based on the frequency domain resource of the reference signal, and/or determining time domain index information based on the time domain resource of the reference signal; and determining the identification information based on one or more of the sequence index information, the frequency domain index information, and the time domain index information. As the reference signal is flexibly configured, requirements for different quantities of reference signal sequences and different network bandwidths can be met. In addition, the reference signal can be configured according to different repetition enhancement requirements and detection distance requirements, so that network devices in networks with different deployment characteristics can perform remote interference measurement. For example, the configuration of the reference signal can be applied to a scenario in which quantities of gNBs deployed by different operators in NR may range from tens of thousands to millions.

According to a third aspect, a communications apparatus is provided. The apparatus has a function of implementing the first aspect, the second aspect, any possible embodiment of the first aspect, or any possible embodiment of the second aspect. The function may be implemented by hardware, or may be implemented by hardware executing corresponding software. The hardware or software includes one or more modules corresponding to the foregoing function.

In a possible embodiment, the apparatus may be a chip or an integrated circuit.

In a possible embodiment, the apparatus includes a transceiver and a processor. The transceiver is configured to communicate with another communications device. The processor is configured to be coupled with a memory, and execute a program stored in the memory. When the program is executed, the apparatus can perform the method in any one of the first aspect, the second aspect, the possible embodiments of the first aspect, or the possible embodiments of the second aspect.

In a possible embodiment, the apparatus further includes a memory, and the memory stores the program executed by the processor.

In a possible embodiment, the apparatus is a terminal.

According to a fourth aspect, a chip is provided. The chip is connected to a memory or the chip includes a memory, and is configured to read and execute a software program stored in the memory, to implement the method in any one of the first aspect, the second aspect, the possible embodiments of the first aspect, or the possible embodiments of the second aspect.

According to a fifth aspect, a communications system is provided. The communications system includes a first network device and a second network device. The first network device is configured to perform the method in any one of the first aspect and the possible embodiments, and/or the second network device is configured to perform the method in any one of the second aspect and the possible embodiments.

According to a sixth aspect, a computer storage medium is provided. The computer storage medium stores a computer program, and the computer program includes an instruction used to perform the method in any one of the foregoing aspects and the possible embodiments of the foregoing aspects.

According to a seventh aspect, a computer program product including an instruction is provided. When the computer program product runs on a computer, the computer is enabled to perform the method in any one of the foregoing aspects and the possible embodiments of the foregoing aspects.

DESCRIPTION OF EMBODIMENTS

Embodiments of this application provide a communication method and a communications apparatus, to help network devices flexibly send and receive reference signals during remote interference measurement between the network devices. The method and the apparatus are based on a same concept. Because principles for resolving a problem by using the method and the apparatus are similar, mutual reference may be made between implementations of the apparatus and the method, and repeated descriptions are omitted. In descriptions of the embodiments of this application, the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. In this application, "at least one" means one or more, and "a plurality of" means two or more. In addition, it should be understood that in the description of this application, terms such as "first" and "second" are merely used for distinguishing and description, but should not be understood as indicating or implying relative importance, or should not be understood as indicating or implying a sequence.

The communication method in the embodiments of this application may be applied to various communications systems, for example, a long term evolution (LTE) system, a worldwide interoperability for microwave access (WiMAX) communications system, a 5$^{th}$ generation (5G) system such as a new radio access technology (NR), and a future communications system such as a 6G system. Two network devices related to remote interference in this application may belong to a same communications system, or may belong to different communications systems.

Figure 2:
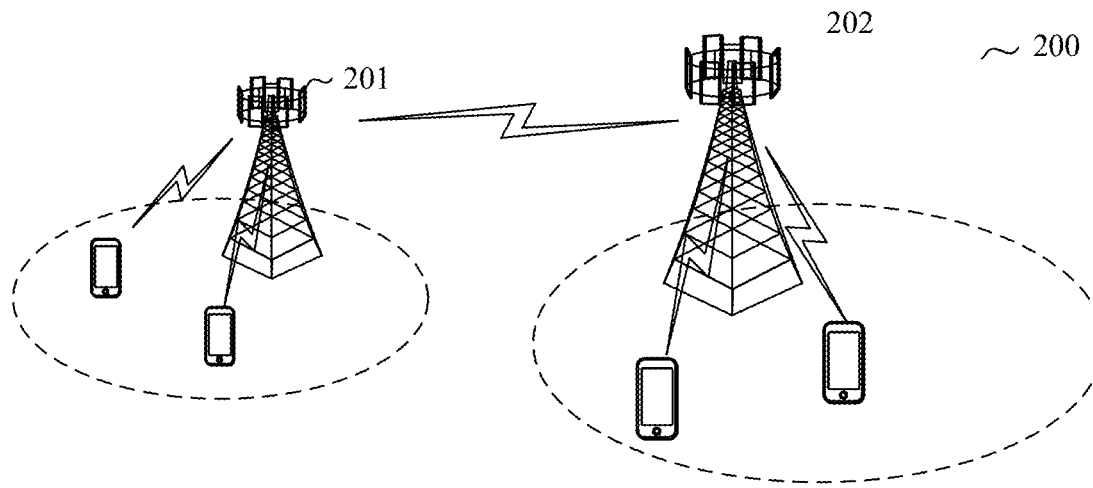
FIG. 2 is a schematic diagram of an architecture of a communications system according to an embodiment of this application.

FIG. 2 shows an architecture of a possible communications system to which a communication method provided in the embodiments of this application is applicable. Referring to FIG. 2, the communications system 200 includes a plurality of network devices. That two network devices are included is used as an example, and the two network devices are represented by a network device 201 and a network device 202. The communications system 200 may further include a plurality of terminals. The network device 201 and the network device 202 separately serve different terminals. Interference exists between the network device 201 and the network device 202, and the network device 201 and the network device 202 may measure and coordinate the interference by sending and receiving a reference signal. In this application, the communications system may include a plurality of network devices. For ease of description, a network device interfered with by another network device may be referred to as an interfered base station, and a network device interfering with another network device may be referred to as an interfering base station. It may be understood that a network device may be only interfered with by another network device, and is an interfered base station, or may only interfere with another network device, and is an interfering base station. It is also possible that the network device interferes with another network device and is also interfered with by another network device. In this case, the network device may determine, according to some determining rules, that the network device is an interfering base station and/or an interfered base station.

Figure 1:
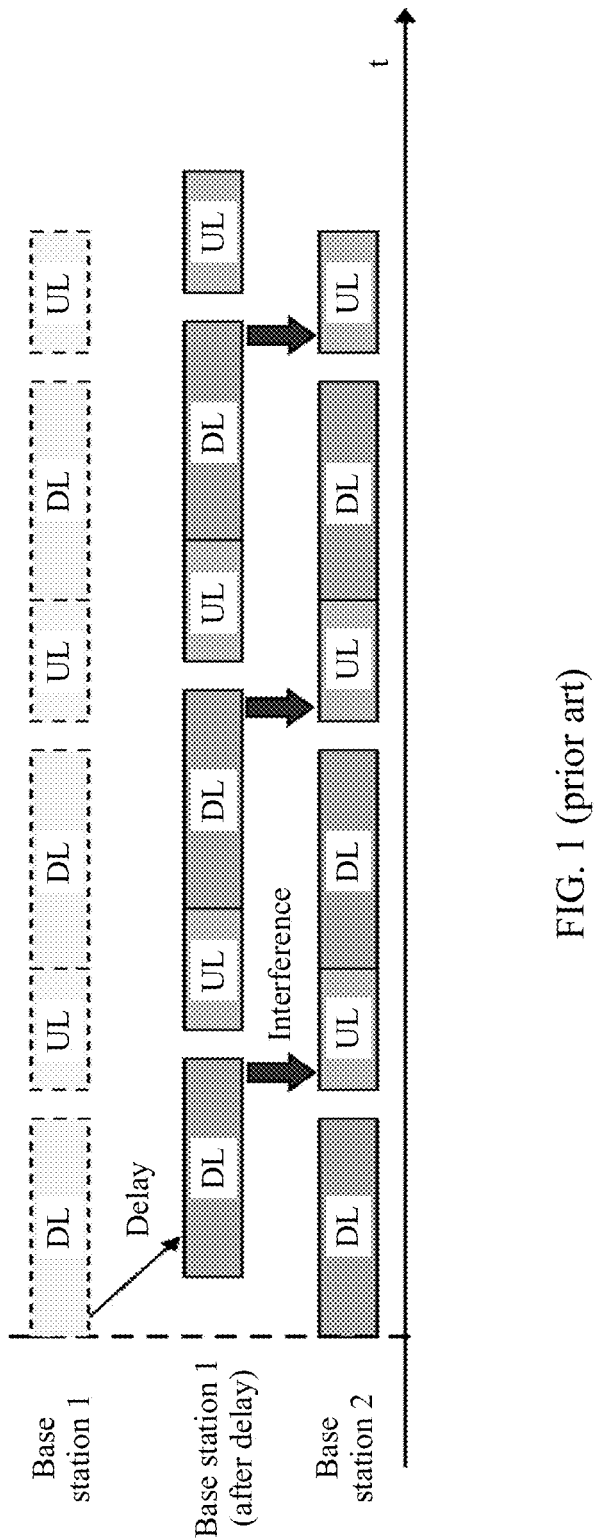
FIG. 1 is a schematic diagram of remote interference.

The communication method provided in the embodiments of this application can be applied to a scenario of remote interference. A specific scenario of remote interference is described in FIG. 1, and details are not described herein again. When the method in this application is applied to the scenario of remote interference, a reference signal sent or received between the network devices may be applied to measurement of remote interference. The reference signal may be referred to as a RIM-RS, or certainly may be referred to as another name. The RIM-RS may be used as an example for description of the reference signal in this application. In this embodiment of this application, the reference signal may further carry other information for interference coordination between an interfering base station and an interfered base station. In an application scenario of remote interference, the network device 201 and the network device 202 may be geographically far from each other. Therefore, the network device 201 and the network device 202 need to perform measurement, and may perform measurement or interference coordination by sending and receiving a RIM-RS.

In the communications system 200, the network device 201 and the network device 202 each are a device with a wireless transceiver function or each may be a chip that can be disposed in the device. The device includes but is not limited to an evolved NodeB (eNB), a radio network controller (RNC), a NodeB (NB), a base station controller (BSC), a base transceiver station (BTS), a home base station (for example, home evolved NodeB or home Node B, HNB), a baseband unit (BBU), an access point (AP) in a wireless fidelity (Wi-Fi) system, a wireless relay node, a wireless backhaul node, a transmission point (transmission and reception point, TRP, or transmission point, TP), or the like, may be a gNB or a transmission point (TRP or TP) in a 5G (for example, NR) system, or one or one group of antenna panels (including a plurality of antenna panels) of a base station in a 5G system, or may be a network node forming a gNB or a transmission point, for example, a baseband unit (BBU) or a distributed unit (DU).

In some deployments, a gNB may include a centralized unit (CU) and a DU. The gNB may further include a radio frequency unit (RU). The CU implements a part of functions of the gNB, and the DU implements a part of the functions of the gNB. For example, the CU implements functions of a radio resource control (RRC) layer and a packet data convergence protocol PDCP) layer, and the DU implements functions of a radio link control (RLC) layer, a media access control (MAC) layer, and a physical (PHY) layer. Information at the RRC layer eventually becomes information at the PHY layer (in other words, information sent through the PHY layer), or is converted from information at the PHY layer. Therefore, in this architecture, higher layer signaling, for example, RRC layer signaling or PDCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal served by the network device may also be referred to as user equipment (UE), an access terminal, a subscriber unit, a subscriber station, a mobile station, a mobile console, a remote station, a remote terminal, a mobile device, a user terminal, a terminal device, a wireless communications device, a user agent, or a user apparatus. The terminal in this embodiment of this application may be a mobile phone, a tablet computer (Pad), a computer having the wireless transceiver function, a virtual reality (VR) terminal device, an augmented reality (AR) terminal device, a wireless terminal in industrial control, a wireless terminal in self driving, a wireless terminal in telemedicine (e.g., remote medical), a wireless terminal in a smart grid, a wireless terminal in transportation safety, a wireless terminal in a smart city, a wireless terminal in a smart home, or the like.

It may be understood that the method in the embodiments of this application may also be applied to another application scenario of interference measurement or interference coordination. The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The following describes in detail the embodiments of this application with reference to accompanying drawings.

The communication method provided in the embodiments of this application relates to sending and receiving of a reference signal between two network devices, and may be performed by a transmitting end and a receiving end, or a first network device and a second network device. For example, the first network device is the transmitting end, and the second network device is the receiving end.

Figure 3:
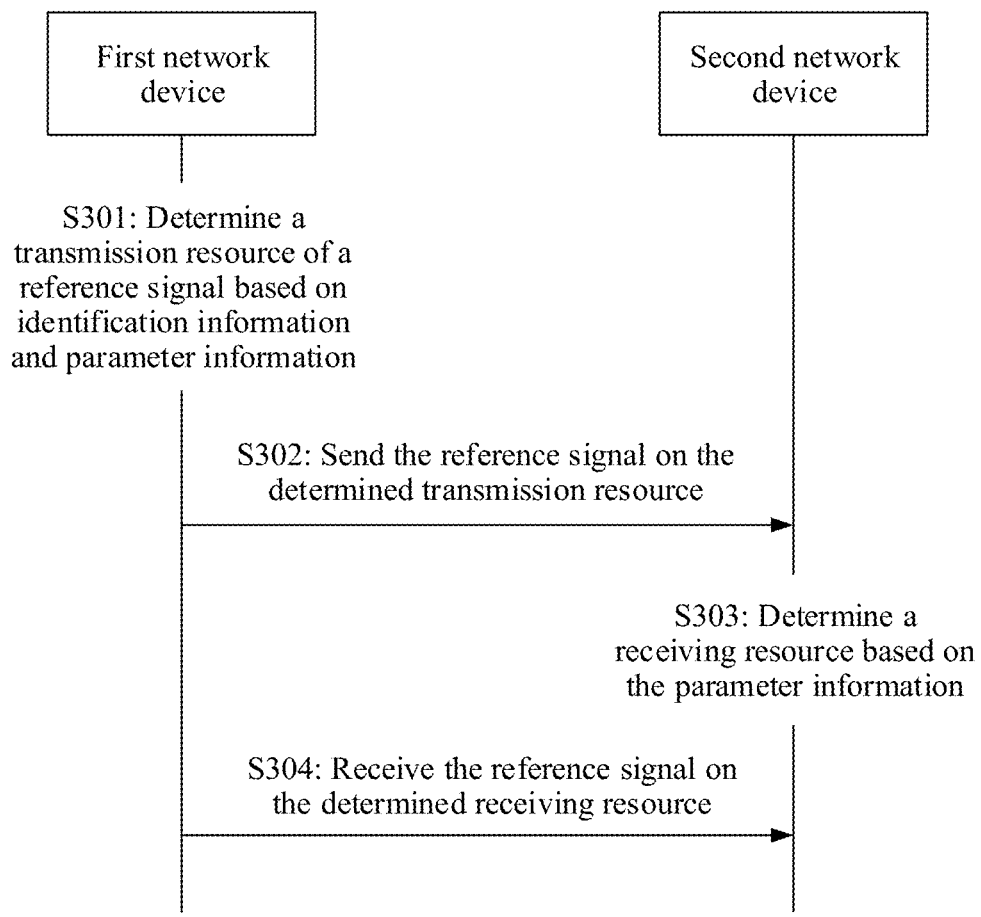
FIG. 3 is a schematic flowchart of a communication method according to an embodiment of this application.

As shown in FIG. 3, a specific procedure of the communication method provided in this application is described as follows.

S301: The first network device determines a transmission resource of a reference signal based on identification information and parameter information.

Herein, the transmission resource of the reference signal may include one or more of a sequence, a frequency domain resource, and a time domain resource of the reference signal.

S302: The first network device sends the reference signal on the determined transmission resource.

S303: The second network device determines a receiving resource based on the parameter information.

S304: The second network device receives the reference signal on the determined receiving resource.

There is no strict execution sequence between S303 and S301/S302. For example, S303 may be performed synchronously with S301 before S302.

Optionally, cross-link interference exists between the first network device and the second network device, and the reference signal is used to detect the cross-link interference.

The following describes concepts in the foregoing method in detail, and describes optional implementations in a process of the foregoing method in detail.

First, the parameter information is described.

The first network device and the second network device may use the same parameter information. The parameter information may include one or more types of information, and the parameter information may be notified to or configured for the network devices by a higher-level node or operation, administration and maintenance (OAM). Some types of parameter information may alternatively be specified by using a protocol.

The parameter information may also be referred to as a global parameter, and may include transmission resources configured for a plurality of network devices. The parameter information may indicate a resource set in one or more of a sequence dimension, a time domain dimension, and a frequency domain dimension. In one embodiment, the parameter information includes sequence indication information, and the sequence indication information is used to indicate one or more candidate sequences. In another embodiment, the parameter information further includes frequency domain indication information, and the frequency domain indication information is used to indicate one or more candidate frequency domain resources. In this application, a resource in the time domain dimension may have different implementations. Implementation 1: The resource in the time domain dimension may be indicated by using the parameter information. To be specific, the parameter information further includes indication information of the time domain resource, and the indication information of the time domain resource is used to indicate one or more candidate time domain resources. Implementation 2: The resource in the time domain dimension may alternatively be indicated in other information. To be specific, indication information of the time domain resource is carried in other information. Implementation 3: Alternatively, indication information of the time domain resource may not be explicitly indicated by using information. In other words, the indication information of the time domain resource is implicitly indicated. The network device may determine the resource in the time domain dimension based on an identifier of the network device, the sequence indication information, and the frequency domain indication information. A manner of implicit indication is described in detail below. It may be understood that the candidate sequences, the candidate frequency domain resources, and the candidate time domain resources are related to the reference signal.

In this application, the network device periodically sends the reference signal in the time domain dimension. A sending period is the resource in the time domain dimension, and each time domain resource in the period of the reference signal may also be considered as a candidate time domain resource of the network device. A plurality of network devices may send or receive the reference signal in a time division manner in one period. One period includes a plurality of time units, and one network device occupies one time unit. The time unit occupied by the network device is a time domain resource in the transmission resource used by the network device to send the reference signal. In time domain, an uplink resource and a downlink resource of the network device are alternately occupied, and one uplink-downlink switching period includes an uplink resource, a downlink resource, and a guard period. If it is allowed to send the reference signal once in one uplink-downlink switching period, the reference signal is sent on several consecutive symbols in only one uplink-downlink period, for example, on only two consecutive symbols. In other words, the uplink-downlink switching period is equivalent to a minimum time granularity for sending the reference signal. One time unit may include one or more uplink-downlink switching periods. In other words, one network device may send one or more reference signals in one time unit in one period.

Based on this, the following describes functions and optional forms of the sequence indication information.

The sequence indication information is used to indicate one or more candidate sequences, or in other words, used to determine a sequence set of reference signals, namely, a set of a maximum number of reference signals that can be sent and received in an entire network in one uplink-downlink switching period. The sequence indication information may indicate a total quantity of the candidate sequences, or may indicate each specific sequence in the candidate sequences.

The sequence indication information may include initial phase indication information of a sequence or initial seed indication information of a sequence. In an example in which a RIM-RS is generated based on a gold sequence, the sequence indication information may indicate an initial phase of a gold sequence corresponding to each RIM-RS, or information needed for generating the initial phase. Table 1 provides an example of the sequence indication information for description. Certainly, the sequence indication information may be represented in another form.

TABLE 1

| Total quantity of RIM-RS sequences | $N_1$ |
|---|---|
| Initial phase generation parameters of gold sequences corresponding to RIM-RSs | $C_0$: xx<br>$C_1$: yy<br>...<br>$C_{N_1-1}$: zz |

In Table 1, the sequence indication information indicates that the total quantity of the RIM-RS candidate sequences is $N_1$, and further indicates initial phases of the gold sequences corresponding to the RIM-RS candidate sequences. In actual application, different $N_1$ may be configured. For example, $N_1$ may be equal to 1, 2, 4, 8, or 16. Certainly, that the total quantity of the RIM-RS sequences is $N_1$ may not be indicated, and may be determined by using a quantity of initial phase parameters of the gold sequences. Alternatively, the sequence indication information may indicate a number of bits needed for representing the total quantity of the RIM-RS sequences, and the number of bits is denoted as $N_{seq}$. Generally, $N_{seq}=\lceil \log_2 N_1 \rceil$. $\lceil x \rceil$ represents that x is rounded up.

C0, C1, . . . , and $C_{N1-1}$ may be the initial phases, or may be information needed for generating the initial phases. If C0, C1, . . . , and $C_{N1-1}$ are the information needed for generating the initial phases, the network device may jointly generate, based on C0, C1, . . . , and $C_{N1-1}$ and other time-related information, RIM-RS sequences used at different times. The other time-related information is, for example, a sending period number, an uplink-downlink switching period number, a subframe number, or a slot number. In this way, the RIM-RS may change with time, thereby providing better confidentiality.

Optionally, the initial phase $c_{init}$ of the gold sequence corresponding to the RIM-RS sequence may be represented by the following formula (1):

$$c_{init}=(2^{10}(c_{ct}+1)(2n_{ID}+1)+n_{ID}) \mod 2^{31} \quad (1)$$

In the formula, $n_{ID}$ is an initial phase generation parameter indicated by the sequence indication information, and $c_{ct}$ is a count of time units, or is a count of other time granularities, for example, a count of periods. Further, it may be specified in advance that $c_{ct}$ is reset at a specific interval, for example, reset at UTC 00:00 every 24 hours.

The initial phase $c_{init}$ of the gold sequence corresponding to the RIM-RS sequence may also be represented by another formula, for example, represented by the following formula (1-2), or represented by another formula, provided that the initial phase can be determined based on the initial phase generation parameter indicated by the sequence indication information:

$$c_{init}=(2^{Nseq}*c_{ct}+n_{ID}) \mod 2^{31} \quad (1-2)$$

If an initial phase of the RIM-RS or all parameters for generating the initial phase have been predefined in a standard protocol, the higher-level node or the OAM does not need to configure the candidate sequences by using the parameter information.

The following describes functions and optional forms of the frequency domain indication information.

The frequency domain indication information is used to indicate one or more candidate frequency domain resources, or in other words, used to determine a candidate frequency domain resource set. The frequency domain indication information may indicate a total quantity of candidate frequency domain resources, or may indicate a specific frequency position of each candidate frequency domain resource. For example, the frequency domain indication information may indicate at least two of a frequency of a starting position, a frequency of an ending position, and an occupied bandwidth of each candidate frequency domain resource.

Table 2 provides an example of the frequency domain indication information for description. Certainly, the frequency domain indication information may be represented in another form.

TABLE 2

| Total quantity of the candidate frequency domain resources | $N_2$ |
|---|---|
| Starting position of the candidate frequency domain resources | $S_0$: aa<br>$S_1$: bb<br>. . . |

TABLE 2-continued

| | $S_{N2-1}$: cc |
|---|---|
| Bandwidth occupied by the candidate frequency domain resources | $B_2$ |

The frequency domain indication information in Table 2 indicates that the total quantity of the candidate frequency domain resources of the reference signal is $N_2$, and further indicates a starting position and an occupied bandwidth $B_2$ of each candidate frequency domain resource. The candidate frequency domain resources are represented by $S_0, \ldots ,$ and $S_{N2-1}$ respectively, and starting positions of the candidate frequency domain resources are represented by aa, bb, cc and the like respectively. In actual application, different $N_2$ may be configured. For example, $N_2$ may be equal to 1, 2, 4, 8, 16, or the like. Certainly, the information $N_2$ about the total quantity of the candidate frequency domain resources is not necessarily indicated, and may be determined based on a quantity of the candidate frequency domain resources. Alternatively, the frequency domain indication information may indicate a number of bits needed for representing the total quantity of the candidate frequency domain resources, and the number of bits is denoted as $N_{freq}$. Generally, $N_{freq}=\lceil \log_2 N_2 \rceil$.

Start frequencies $S_0, S_1, \ldots,$ and $S_{N2-1}$ may be represented by absolute frequencies, resource block (RB) numbers, or subcarrier numbers. The occupied bandwidth $B_2$ may be represented by an absolute frequency width, a quantity of consecutive RBs, or a quantity of consecutive subcarriers. In addition, an ending position of each candidate frequency domain resource may be used to replace a bandwidth of the RIM-RS, and this can also achieve an effect of indicating the bandwidth of the reference signal.

It should be noted that, if at least two of starting positions, ending positions, and bandwidths of different system bandwidths/carrier bandwidths/total quantities of the candidate frequency domain resources are predefined in the standard protocol, the higher-level node or the OAM does not need to configure the candidate frequency domain resources by using the parameter information.

If the parameter information further includes period indication information, the following describes functions and optional forms of the period indication information. The period indication information may be indicated in the parameter information, or may be indicated by using other information.

The period indication information is used to indicate the candidate time domain resources. The period indication information may indicate a time length of a period for sending the reference signal. For example, the period indication information indicates a total quantity $N_3$ of time units included in one period. The period indication information may also indicate a number of bits needed by a period length, and is denoted as $N_{tu}$. Generally, $N_{tu}=\lceil \log_2 N_3 \rceil$. An uplink-downlink switching period with a minimum sending granularity may be calculated by multiplying $N_3$ by a quantity of uplink-downlink switching periods included in each time unit. For another example, the period indication information may also indicate a total quantity of uplink-downlink switching periods included in one period.

Considering that the reference signal may need to be repeatedly sent for enhancement, or considering a near-far effect of detecting a distance, the reference signal needs to be sent at different symbol positions in different uplink-downlink switching periods. In this case, one time unit may include a plurality of uplink-downlink switching periods.

The network device sends a plurality of reference signals in a plurality of uplink-downlink switching periods.

Based on this, optionally, reference information may further include one or more pieces of the following indication information, to indicate a specific sending form of the reference signal. For distinguishing and description, the following uses first indication information, second indication information, third indication information, and the like to indicate the sending form.

Figure 4A:
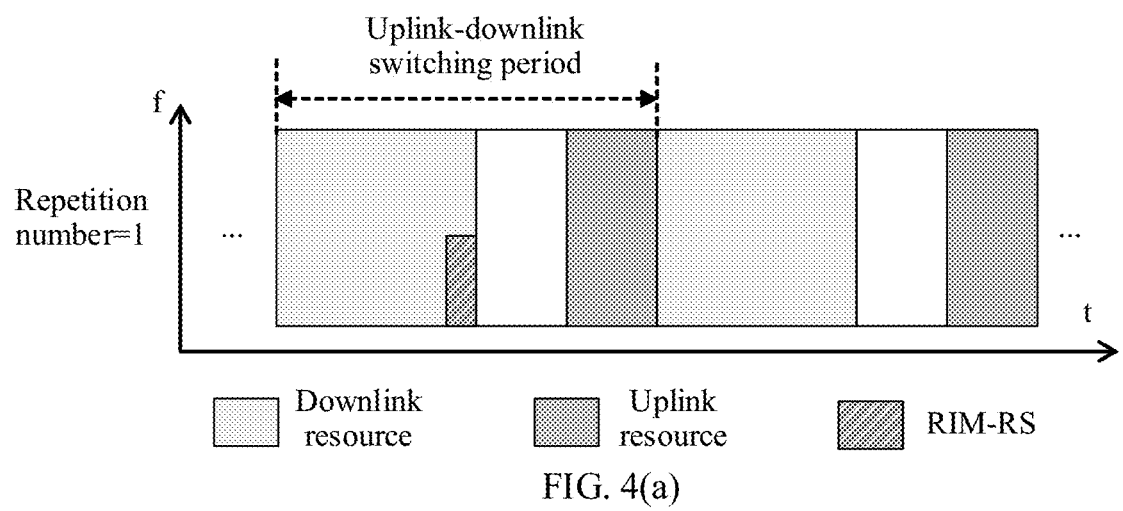
FIG. 4(a) and FIG. 4(b) are a schematic diagram of repeatedly sending a reference signal according to an embodiment of this application.
Figure 4B:
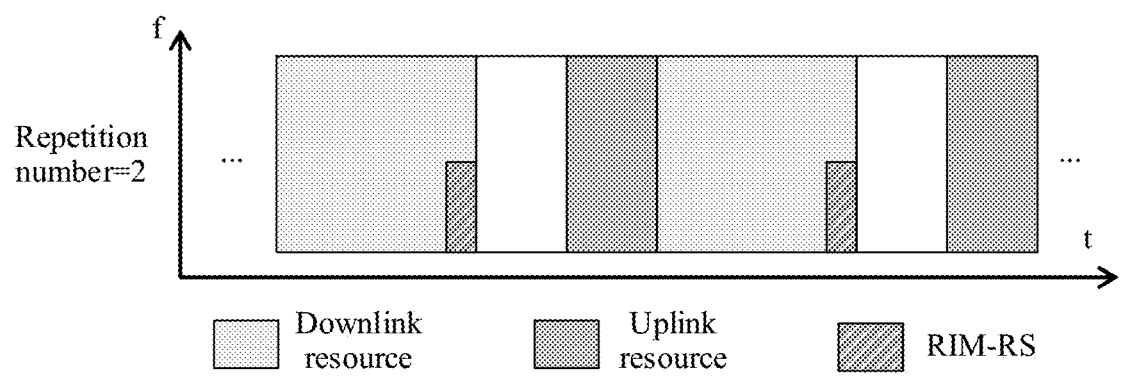

The first indication information is used to indicate a quantity of times of repeatedly sending the reference signal. In one uplink-downlink switching period, there is usually only one time-frequency resource used to send the reference signal. Herein, repeated sending refers to a quantity of times of repeatedly sending the reference signal in one period. In other words, in one period, and in a plurality of consecutive uplink-downlink switching periods, a same reference signal is sent at a same time-frequency resource position in each uplink-downlink switching period. FIG. 4(a) and FIG. 4(b) are used as an example. FIG. 4(a) shows an example of sending a reference signal in one period with a repetition number of 1. In other words, the reference signal is sent in only one uplink-downlink switching period in one period, and is not repeatedly sent. FIG. 4(b) shows an example of sending a reference signal in one period with a repetition number of 2. In other words, a same reference signal is sent twice at a same time-frequency resource position in two consecutive uplink-downlink switching periods in one period. A RIM-RS is used as an example of the reference signal.

The first indication information may indicate a quantity of times $N_4$ of repeatedly sending the reference signal. In actual application, different $N_4$ may be configured, and $N_4$ is a natural number or a positive integer. For example, $N_4=1$ may be used to indicate that the reference signal is not repeatedly sent, and $N_4=2$ may be used to indicate that a same reference signal is sent twice at a same time-frequency resource position in two consecutive uplink-downlink switching periods in one period. Optionally, the first indication information may further indicate an index of a predefined list, and each index represents a different repetition number. For example, $N_4=0$ may be used to indicate that the reference signal is not repeatedly sent, and $N_4=1$ may be used to indicate that a same reference signal is sent twice at a same time-frequency resource position in two consecutive uplink-downlink switching periods in one period. Certainly, the first indication information may alternatively indicate a repetition sending rule of the reference signal in another indication manner.

The second indication information is used to indicate a position, of a symbol that carries the reference signal, in an uplink-downlink switching period, for example, the position is represented by $L_5$. For example, the second indication information may indicate at least two of a starting position and an ending position of a resource occupied by the symbol that carries the reference signal in the uplink-downlink switching period, and a total quantity of occupied symbols, to represent the position of the symbol that carries the reference signal in the uplink-downlink switching period. When the total quantity of symbols occupied by the reference signal is predefined, the second indication information may indicate one of the starting position and the ending position of the resource occupied by the symbol that carries the reference signal in the uplink-downlink switching period, to represent the position of the symbol that carries the reference signal in the uplink-downlink switching period. In an example in which the reference signal is a RIM-RS, the symbol is an orthogonal frequency division multiplexing (OFDM) symbol. When the second indication information indicates the position of the symbol that carries the RIM-RS, there may be a plurality of methods. For example, a symbol index of the first symbol or the last symbol in a plurality of OFDM symbols occupied by the RIM-RS in one uplink-downlink switching period may be indicated. For another example, a number of a slot in which the first symbol or the last symbol in the plurality of OFDM symbols occupied by the RIM-RS is located, and a symbol index of the first symbol or the last symbol in the slot may be indicated. For yet another example, a quantity of offset symbols, relative to a reference position, of the first symbol or the last symbol in the plurality of OFDM symbols occupied by the RIM-RS may be indicated. The reference position may be an OFDM symbol, for example, the last downlink OFDM symbol or the first uplink OFDM symbol in an uplink-downlink switching period. The reference position may be preconfigured or predefined, or may be included in the second indication information.

Figure 5:
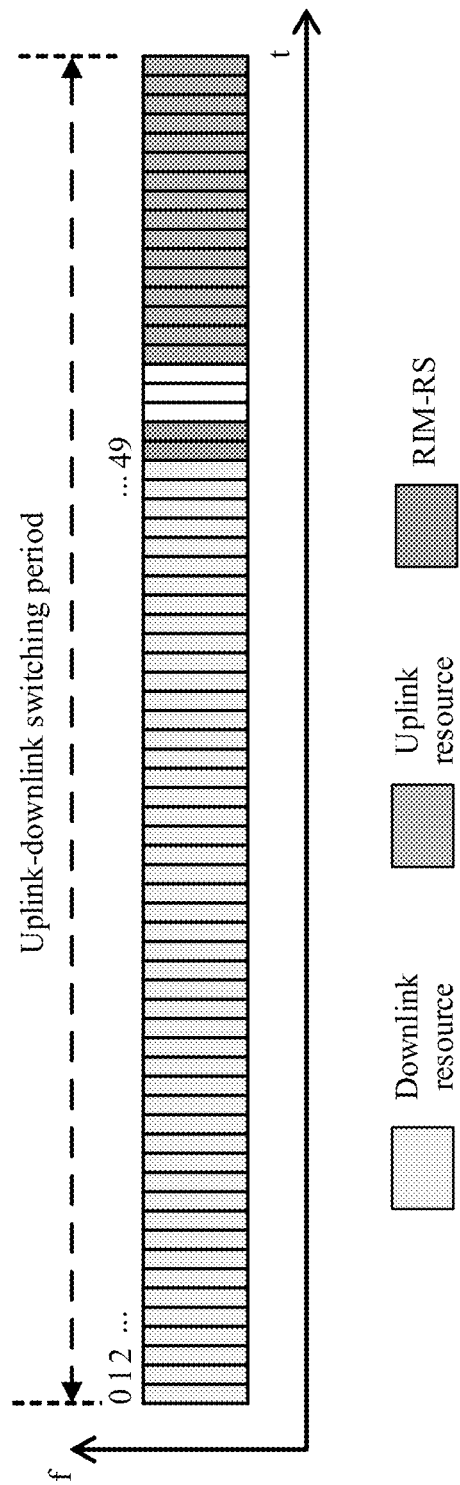
FIG. 5 is a schematic diagram of indicating a symbol position according to an embodiment of this application.

For example, as shown in FIG. 5, if a reference signal is sent once in an uplink-downlink switching period and two symbols are occupied, the second indication information may indicate the first symbol of the two symbols or indicate the last symbol of the two symbols. Specifically, a symbol index of the first symbol or the last symbol may be indicated. For example, in FIG. 5, symbols in an uplink-downlink switching period are numbered from 0, and two symbols occupied for sending the reference signal are numbered 49 and 50. In this case, the second indication information may indicate at least two of the symbol numbered 49 or the symbol numbered 50, or indicate that two symbols are occupied.

Further, the second indication information may further indicate a plurality of different positions. In other words, positions for sending the reference signal in different uplink-downlink switching periods are different. In this case, the second indication information may indicate a total quantity of positions of symbols that carry the reference signal in the uplink-downlink switching period, and may further indicate information about a specific position. In an example in which a reference signal symbol is a RIM-RS symbol, a possible representation form is shown in Table 3. The second indication information indicates a quantity $N_5$ of RIM-RS symbol positions, and further indicates each RIM-RS symbol position. For example, the quantity of the positions is 2, and each RIM-RS symbol position is represented by $\{L_{5-0}, L_{5-1}\}$. Similarly, the quantity $N_5$ of the RIM-RS symbol positions is not mandatory, and may be determined based on an amount of information about each RIM-RS symbol position.

TABLE 3

| Quantity of the RIM-RS symbol positions | $N_5$ |
|---|---|
| RIM-RS symbol position | $\{L_{5-0}, L_{5-1}\}$ |

Figure 6:
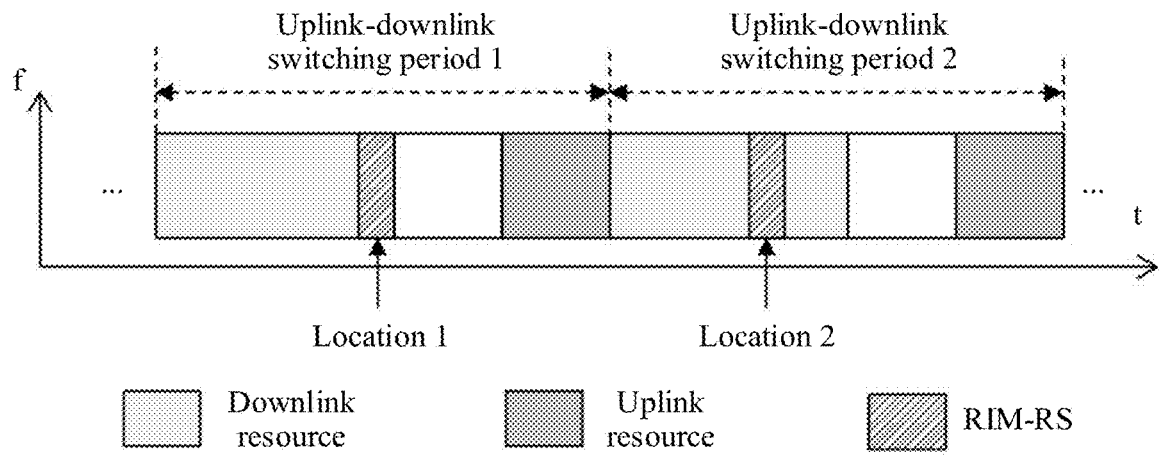
FIG. 6 is a schematic diagram of indicating a symbol position according to an embodiment of this application.

For example, as shown in FIG. 6, in a time unit, a reference signal symbol position in an uplink-downlink switching period 1 is a position 1, and the reference signal symbol position in an uplink-downlink switching period 2 is a position 2.

By indicating a plurality of different reference signal symbol positions, the different reference signal symbol positions can correspond to different detection distances, and the reference signal is sent at different symbol positions in a plurality of uplink-downlink switching periods, so that a detection range of a distance between an interfering base station and an interfered base station can be expanded.

If the quantity $N_4$ of times, indicated by the first indication information, of repeatedly sending the reference signal refers to a plurality of times, and there are also a plurality of positions $N_5$, indicated by the second indication information, of symbols of the reference signal in the uplink-downlink switching period, in a possible implementation, $N_4*N_5$ uplink-downlink switching periods are included in one time unit. The reference signal may be sent in a manner of repeatedly sending the reference signal for $N_4$ times at a same symbol position in each uplink-downlink switching period one by one. Specifically, the reference signal is first repeatedly sent for $N_4$ times at first symbol positions in $N_4$ consecutive uplink-downlink switching periods, then is repeatedly sent for $N_4$ times at second symbol positions in the $N_4$ consecutive uplink-downlink switching periods, and so on, until the reference signal is repeatedly sent for $N_4$ times at $N_5^{th}$ symbol positions. In this way, at the receiving end, combination detection may be performed on reference signals that have a same symbol position, and centralized repetition of the reference signals helps avoid deterioration of combination performance caused by a radio channel change.

Figure 7:
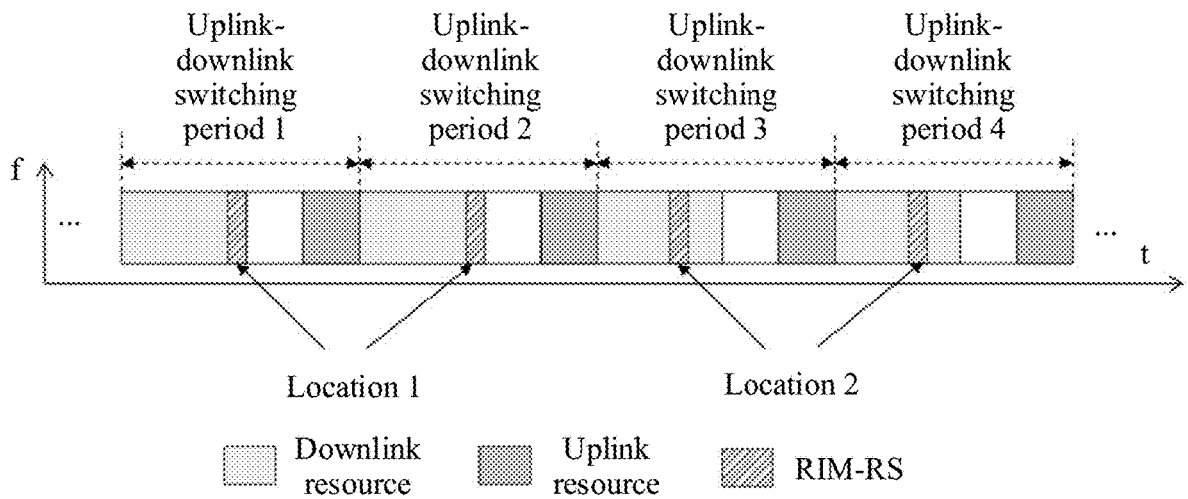
FIG. 7 is a schematic diagram of repeatedly sending a reference signal at different positions according to an embodiment of this application.

For example, as shown in FIG. 7, $N_4=2$. In this case, one time unit includes 2*2=4 uplink-downlink switching periods. Two reference signal symbol positions are represented by a position 1 and a position 2. The reference signal may be sent at a position 1 of an uplink-downlink switching period 1 and a position 1 of an uplink-downlink switching period 2, and the reference signal may be sent at a position 2 of an uplink-downlink switching period 3 and a position 2 of an uplink-downlink switching period 4. In this way, in one time unit, the first network device sends four same reference signals in total in the four uplink-downlink switching periods.

Figure 8:
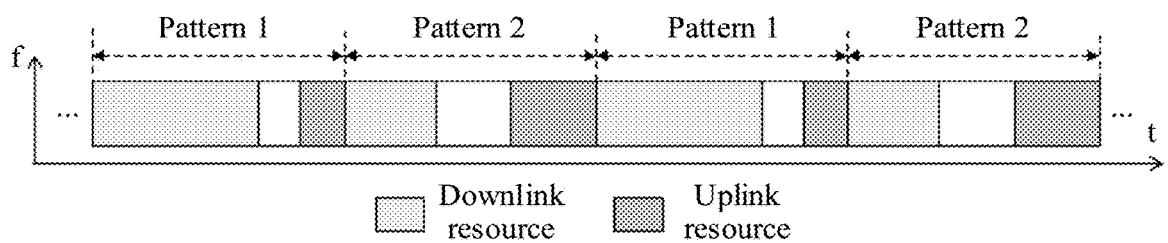
FIG. 8 is a schematic diagram of patterns of uplink-downlink switching periods according to an embodiment of this application.

In the prior approaches, patterns of uplink-downlink switching periods may be different. The patterns refer to designs of positions and proportions occupied by uplink resources, downlink resources, and guard intervals in the uplink-downlink switching periods. As shown in FIG. 8, a network device configures two uplink-downlink switching periods of different patterns which may be denoted as a pattern 1 and a pattern 2. Proportions of downlink resources to uplink resources in the pattern 1 and the pattern 2 may be different. When two uplink-downlink switching period patterns are configured, an uplink-downlink period corresponding to the pattern 1 and an uplink-downlink period corresponding to the pattern 2 may cyclically alternate with each other.

Considering that the patterns of the uplink-downlink switching periods may be different, the following describes in detail reference signal indication manners when the patterns are different.

Generally, a reference signal may be sent in one or some of the different patterns, or a reference signal may be sent in each of the different patterns. Regardless of which sending manner is used, a design requirement on a quantity of times of repeatedly sending a reference signal and a reference signal symbol position needs to be met.

In this application, the parameter information may further include third indication information. The third indication information is used to indicate an uplink-downlink switching period for carrying a reference signal in uplink-downlink switching periods of different patterns. For example, uplink-downlink switching periods of two patterns are represented by a first uplink-downlink switching period and a second uplink-downlink switching period, and the first uplink-downlink switching period and the second uplink-downlink switching period are adjacent in time domain. The third indication information is used to indicate an uplink-downlink switching period that is used for carrying a reference signal and that is in the first uplink-downlink switching period and the second uplink-downlink switching period. Specifically, the third indication information is used to indicate to carry the reference signal only in the first uplink-downlink switching period, carry the reference signal only in the second uplink-downlink switching period, or carry the reference signal in both the first uplink-downlink switching period and the second uplink-downlink switching period.

An example of a representation form of the third indication information is shown in Table 4. The third indication information in Table 4 indicates a quantity, represented by $N_6$, of uplink-downlink switching periods for carrying a reference signal, and further indicates specific patterns of the uplink-downlink switching period used for carrying the reference signal. The first uplink-downlink switching period is represented by $P_1$, and the second uplink-downlink switching period is represented by $P_2$. Assuming that the reference signal is carried only in the second uplink-downlink switching period, $\{P_2\}$ is indicated.

TABLE 4

| | |
|---|---|
| Quantity of patterns of the uplink-downlink switching periods for carrying the reference signal | $N_6$ |
| Pattern of an uplink-downlink switching period | $\{P_2\}$ |

Similarly, information about the quantity of the uplink-downlink switching periods for carrying the reference signal is not mandatory, and the first network device may determine the information based on the quantity of the patterns of the uplink-downlink switching periods for carrying the reference signal. For example, the third indication information may further indicate, by using $N_6=1$ and $\{P_1\}$, that a RIM-RS is transmitted only in the first uplink-downlink switching period, or may indicate, by using $N_6=2$ and $\{P_1, P_2\}$ or $\{$'Both'$\}$, that a RIM-RS is transmitted in the two uplink-downlink switching periods. A specific form is not limited. If it is predefined that when the network device configures two uplink-downlink switching periods, only one uplink-downlink switching period is used for transmitting a reference signal, the third indication information may indicate only that the reference signal is sent in a specific one of the two uplink-downlink switching periods.

Considering that the patterns of the uplink-downlink switching periods are different, with reference to the foregoing design of the quantity of times of repeatedly sending the reference signal and the reference signal symbol positions, the following describes, by using examples, reference signal indication manners when the patterns, the repetition numbers, and the reference signal symbol positions are different.

Case 1:

The first indication information indicates that the quantity of times of repeatedly sending the reference signal is $N_4$, the second indication information indicates that the total quantity of the positions, of the symbols carrying the reference signal, in the uplink-downlink switching periods is $N_5$, and the third indication information indicates that there is only one uplink-downlink switching period for carrying the reference signal, and this uplink-downlink switching period may be referred to as a valid uplink-downlink switching period.

In this case, the first network device should transmit the RIM-RS in the valid uplink-downlink switching period. If there are two uplink-downlink switching periods, the first network device transmits the RIM-RS at an interval of one uplink-downlink switching period. A first symbol position may be repeated for $N_4$ times, then a second symbol position is repeated for $N_4$ times, and so on, until an $N_5{}^{th}$ symbol position is repeated for $N_4$ times.

Figure 9:
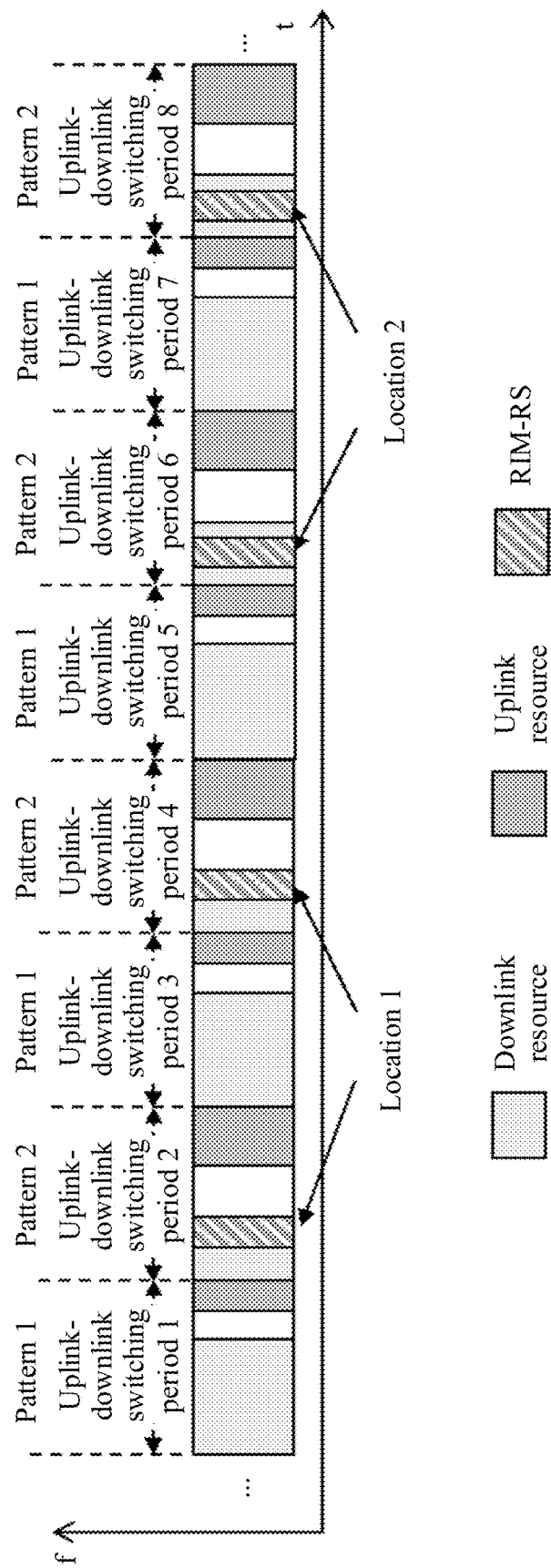
FIG. 9 is a schematic diagram of reference signal indication manners when patterns are different according to an embodiment of this application.

As shown in FIG. 9, it is assumed that the repetition number $N_4$ is 2, a quantity $N_5$ of reference signal symbol positions is 2, the reference signal symbol positions in uplink-downlink switching periods are positions 1 and positions 2, and patterns of the uplink-downlink switching periods are, for example, a pattern 1 and a pattern 2. In addition, only the latter one of two uplink-downlink switching periods is a valid uplink-downlink switching period. In this case, a process of sending the reference signal in one time unit is shown in FIG. 9. Four same reference signals are sent in one time unit.

Case 2:

The first indication information indicates that the quantity of times of repeatedly sending the reference signal is $N_4$, the second indication information indicates that the total quantity of the positions, of the symbols carrying the reference signal, in the uplink-downlink switching periods is $N_5$, and the third indication information indicates that there are two uplink-downlink switching periods for carrying the reference signal. The two uplink-downlink switching periods are both valid uplink-downlink switching periods. A quantity of uplink-downlink switching periods included in one time unit is twice that of uplink-downlink switching periods of a single pattern. Certainly, two patterns are used as an example. In actual application, there may be more than two patterns.

In this case, the first network device transmits the RIM-RS in the two valid uplink-downlink switching periods. Because there are two patterns of valid uplink-downlink switching periods, the first symbol position may first be repeated for $2*N_4$ times, then the second symbol position is repeated for $2*N_4$ times, and so on, until the $N_5{}^{th}$ symbol position is repeated for $2*N_4$ times.

Figure 10:
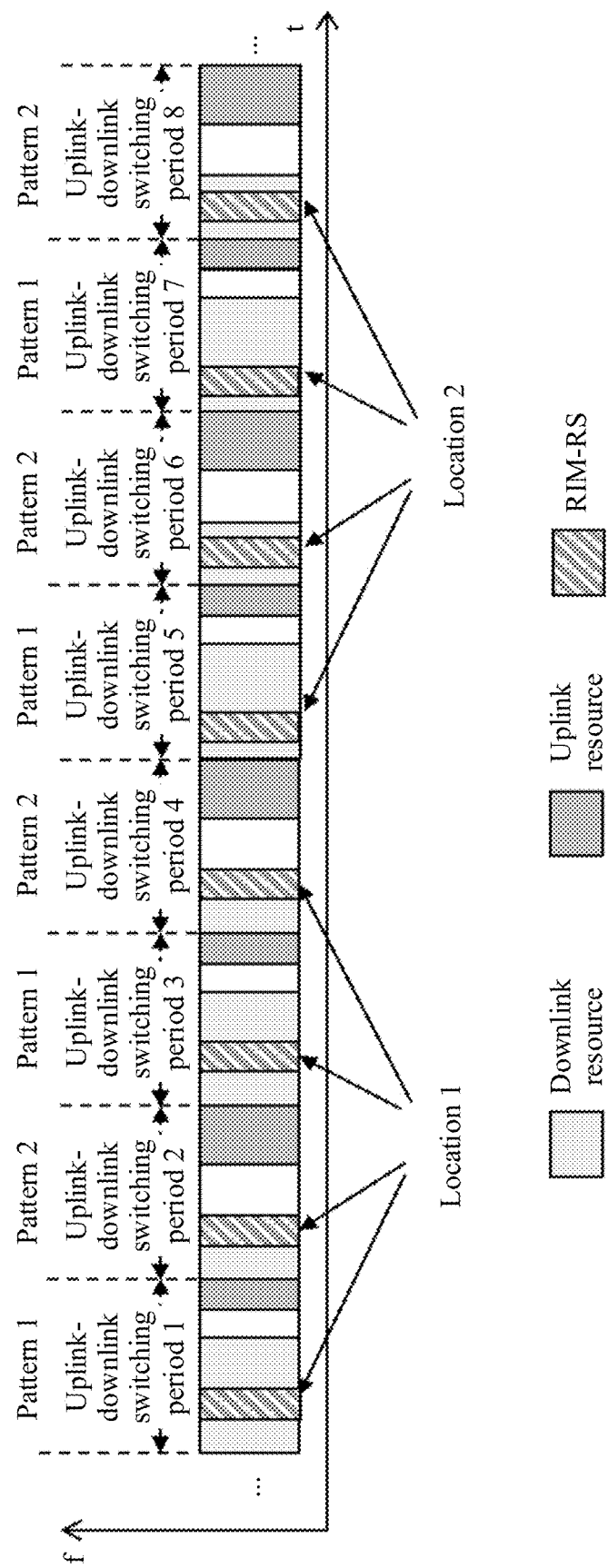
FIG. 10 is a schematic diagram of reference signal indication manners when patterns are different according to an embodiment of this application.

As shown in FIG. 10, it is assumed that the repetition number $N_4$ is 2, a quantity $N_5$ of reference signal symbol positions is 2, the reference signal symbol positions in uplink-downlink switching periods are positions 1 and positions 2, and patterns of the uplink-downlink switching periods are for example, a pattern 1 and a pattern 2. In addition, two uplink-downlink switching periods are both valid uplink-downlink switching periods. In this case, a process of sending the reference signal in one time unit is shown in FIG. 10. Eight same reference signals are sent in one time unit.

Case 3:

The first indication information indicates that the quantity of times of repeatedly sending the reference signal is $N_4$, the second indication information indicates that the total quantity of the positions, of the symbols carrying the reference signal, in the uplink-downlink switching periods is $N_5$, and the third indication information indicates that there are two uplink-downlink switching periods for carrying the reference signal. The two uplink-downlink switching periods are both valid uplink-downlink switching periods. A quantity of uplink-downlink switching periods included in one time unit is equal to that of uplink-downlink switching periods of a single pattern.

In this case, the first network device may not distinguish between the patterns of the uplink-downlink switching periods, and this may be understood as that a sending method is the same as that in uplink-downlink switching periods of a same pattern. To be specific, a first symbol position is repeated for $N_4$ times, then a second symbol position is repeated for $N_4$ times, and so on, until an $N_5{}^{th}$ symbol position is repeated for $N_4$ times.

Figure 11:
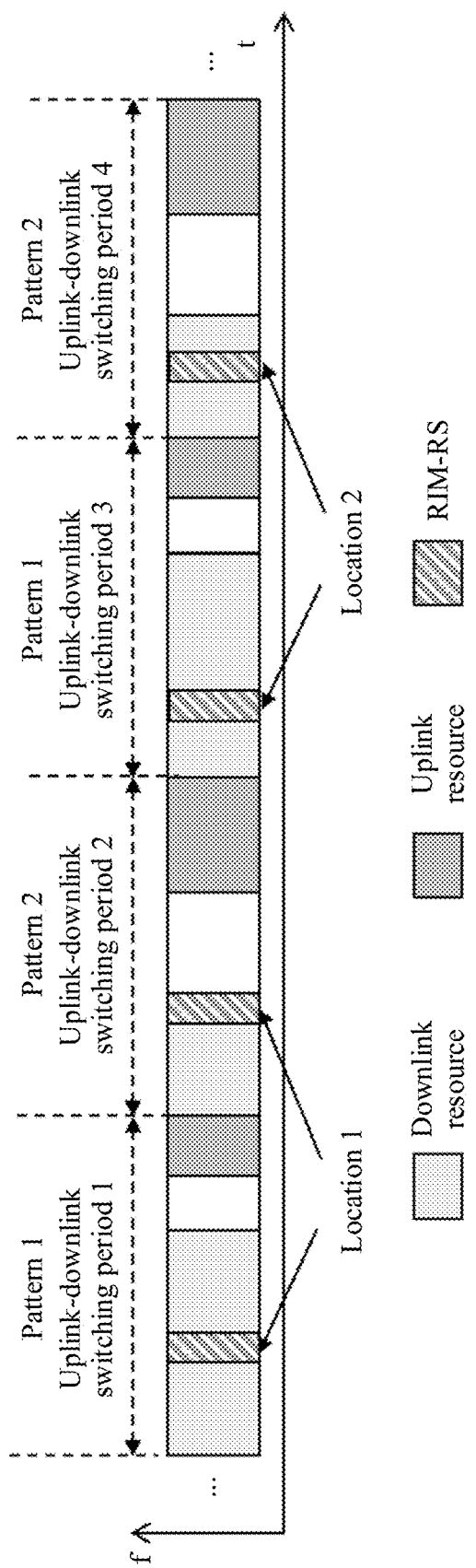
FIG. 11 is a schematic diagram of reference signal indication manners when patterns are different according to an embodiment of this application.

As shown in FIG. 11, it is assumed that the repetition number $N_4$ is 2, a quantity $N_5$ of reference signal symbol positions is 2, the reference signal symbol positions in uplink-downlink switching periods are positions 1 and positions 2, and patterns of the uplink-downlink switching periods are for example, a pattern 1 and a pattern 2. In addition, two uplink-downlink switching periods are both valid uplink-downlink switching periods. In this case, a process of sending the reference signal in one time unit is shown in FIG. 10. Four same reference signals are sent in one time unit.

In conclusion, a quantity of uplink-downlink switching periods included in one time unit in this application may be determined in the following manner.

When a network device is configured with a single uplink-downlink switching period pattern, the quantity of the uplink-downlink switching periods included in one time unit may be determined based on a repetition number $N_4$ and a quantity $N_5$ of reference signal symbol positions, and the quantity of the uplink-downlink switching periods included in one time unit is $N_4*N_5$.

When the network device is configured with m uplink-downlink switching period patterns, the quantity of the uplink-downlink switching periods included in one time unit may be determined based on the repetition number $N_4$, the quantity $N_5$ of the reference signal symbol positions, and a valid uplink-downlink switching period. When only one uplink-downlink switching period is a valid period, the quantity of the uplink-downlink switching periods included in one time unit is $2*N_4*N_5$. When m uplink-downlink switching periods are all valid periods, the quantity of the uplink-downlink switching periods included in one time unit is $m*N_4*N_5$ or $N_4*N_5$. For example, m=2, and when the two uplink-downlink switching periods are both valid periods, the quantity of the uplink-downlink switching periods included in one time unit is $2*N_4*N_5$ or $N_4*N_5$.

So far, the foregoing describes the parameter information in this application in detail. The parameter information is applicable to both the first network device and the second network device.

For the first network device, before sending the reference signal, the first network device needs to determine the transmission resource of the reference signal. The first network device may determine the transmission resource of the reference signal based on the identification information and the parameter information. The identification information may also be configured by the higher-level node and the OAM.

The identification information may also be referred to as an identification number or an identifier, and is mainly used to identify and represent the network device that sends the reference signal (RIM-RS). In other words, the identification information is used to identify the first network device. The identification information may be defined in a plurality of manners. For example, the identification information may be an identifier of a gNB (gNB ID) in NR, or may be a gNB group identifier (set ID) obtained after NR cells are grouped, or may be an identifier obtained by performing further mapping transformation based on a gNB ID or a set ID, for example, may be N most significant bits or N least significant bits of the gNB ID or the set ID, or may be another predefined identifier. The identification information may carry certain coordination information. One gNB may have one or more identification numbers. For example, one gNB may have two identification numbers: an identification number 1 and an identification number 2. When the gNB is used as an interfered base station, the gNB corresponds to the identification number 1, and when the gNB is used as an interfering base station, the gNB corresponds to the identification number 2. The gNB may determine, based on an interfering/interfered state of the gNB, to send a RIM-RS corresponding to the identification number 1 and/or the identification number 2.

The first network device may select, based on the identification information and from candidate resources indicated by the parameter information, a transmission resource used by the first network device to send a reference signal.

Specifically, the first network device determines, from one or more candidate sequences indicated by the sequence indication information, the sequence of the reference signal corresponding to the identification information. The first network device determines, from one or more candidate frequency domain resources indicated by the frequency domain indication information, the frequency domain resource corresponding to the identification information. If the parameter information includes the period indication information, or the period indication information is indicated in other information, the first network device determines, in a period indicated by the period indication information, the time domain resource corresponding to the identification information. If the parameter information does not include the period indication information, the first network device may determine the period of the reference signal based on the identification information, the sequence indication information, and the frequency domain indication information, and then determine the time domain resource corresponding to the identification information in the period.

How the identification information corresponds to the transmission resource that is in the candidate resources and that is used by the first network device to send the reference signal may be implemented in the following manner:

Based on the parameter information, a {code, frequency, time} resource space that includes a sequence, a frequency domain resource, and a time domain resource may be determined. Each resource in the resource space corresponds to an index of one resource. $n_{seq}$ is denoted as a sequence index, $n_{freq}$ is denoted as a frequency domain index, and $n_{tu}$ is denoted as a time domain index. In this case, a combination of $\{n_{seq}, n_{freq}, n_{tu}\}$ may be used as a resource index of the {code, frequency, time} resource space. Specifically, $\{n_{seq}, n_{freq}, n_{tu}\}$ with a different value corresponds to a different resource in the code, frequency, and time resource space.

Optionally, a number $n_{idx}$ may be used as a resource index of a resource in the code, frequency, and time resource space. For example, a relationship between $n_{idx}$ and $\{n_{seq}, n_{freq}, n_{tu}\}$ may be a formula (2):

$$n_{idx} = (n_{seq}) * 2^{N_{freq}} * 2^{N_{tu}} + (n_{freq}) * 2^{N_{tu}} + n_{tu} \tag{2}$$

$N_{freq}$ is a number of bits needed to represent a quantity of frequency domain resource positions, and $N_{tu}$ is a number of bits needed to represent a quantity of time units in one reference signal transmission period. Generally, $N_{freq} = \lceil \log_2 N_2 \rceil$, $N_2$ is a quantity of positions of the candidate frequency domain resources, and $\lceil x \rceil$ indicates that x is rounded up. For example, if there are a total of three positions of the candidate frequency domain resources, a value of $N_{freq}$ is 2. $N_{tu}$ has a similar case. Generally, $N_{tu} = \lceil \log_2 N_3 \rceil$, $N_3$ is a quantity of time units included in one reference signal transmission period.

Figure 12:
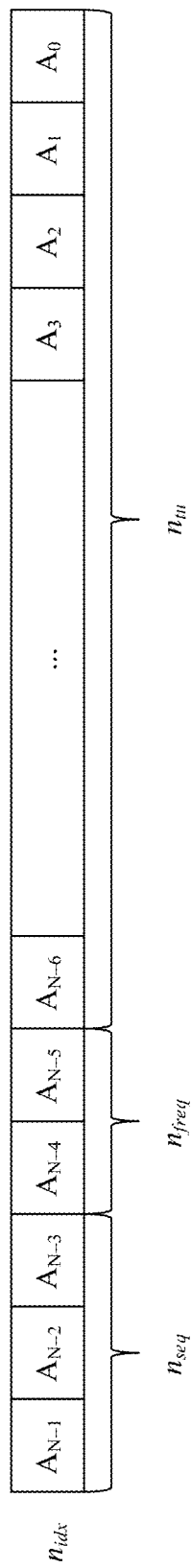
FIG. 12 is a schematic diagram of resource index information according to an embodiment of this application.

In the formula (2), a relationship between $n_{idx}$ and $\{n_{seq}, n_{freq}, n_{tu}\}$ may be represented by FIG. 12. It is assumed that a number of bits of $n_{idx}$ is N, and a number of bits $N_{seq}$ needed to represent a quantity of sequences is 3. Generally, $N_{seq} = \lceil \log_2 N_1 \rceil$, and $N_{freq}$ is 2.

On the contrary, a mapping relationship between, $n_{seq}$, $n_{freq}$, $n_{tu}$ and $n_{idx}$ may be represented by a formula (3) to a formula (6):

$$n_{tu} = \mathrm{mod}(n_{idx}, 2^{N_{tu}}) \tag{3}$$

$$n_{freq} = \mathrm{mod}\left(\frac{n_{idx} - n_{tu}}{2^{N_{tu}}}, 2^{N_{freq}}\right) \tag{4}$$

$$n_{seq} = \mathrm{mod}\left(\frac{n_{idx} - (n_{freq}) * 2^{N_{tu}-n_{tu}}}{2^{N_{freq}} * 2^{N_{tu}}}, 2^{N_{seq}}\right) \tag{5}$$

Considering that $n_{seq}$ is always less than or equal to $2^{N_{seq}}$, the formula (5) may also be written as:

$$n_{seq} = \frac{n_{idx} - (n_{freq}) * 2^{N_{tu}-n_{tu}}}{2^{N_{freq}} * 2^{N_{tu}}} \tag{6}$$

It should be noted that a correspondence between N bits of the identification information in the mapping relationship and $N_{seq}$ bits used to determine the sequence index, $N_{freq}$ bits used to determine the frequency domain resource positions, and $N_{tu}$ bits used to determine the time domain resource may also have another form, and $N_{seq}$, $N_{freq}$, and $N_{tu}$ are not limited to be $N_{seq}$ most significant bits, $N_{freq}$ medium significant bits, and $N_{tu}$ least significant bits in the N bits, provided that the bits are clearly in one-to-one correspondences. For example, $N_{seq}$, $N_{freq}$, and $N_{tu}$ may alternatively be $N_{seq}$ least significant bits, $N_{freq}$ medium significant bits, and $N_{tu}$ most significant bits or $N_{seq}$ least significant bits, $N_{freq}$ most significant bits, and $N_{tu}$ medium significant bits in the N bits of the identification information. A corresponding mathematical relationship may also be expressed in a manner similar to formula (2).

The first network device may determine one piece of resource index information based on the identification information. The resource index information herein is a resource index indicating the {code, frequency, time} resource space, and may be considered as the foregoing $n_{idx}$. Optionally, the identification information may be equivalent to the resource index information, or a mapping relationship between the identification information and the resource index information may be established in an operation manner such as a reverse order or a modulo operation. In addition, the first network device may also determine resource index information of different domains based on the identification information. For example, sequence index information is determined based on a first part of the identification information, frequency domain index information is determined based on a second part of the identification information, and time domain index information is determined based on a third part of the identification information.

The first network device may determine the sequence index information corresponding to the identification information, and determine, from the candidate sequences, a sequence of the reference signal corresponding to the sequence index information. The first network device may also determine the frequency domain index information corresponding to the identification information, and determine, from the candidate frequency domain resources, a frequency domain resource corresponding to the frequency domain index information. If a network device is notified of or is configured with the period indication information, the first network device may determine the time domain index information corresponding to the identification information, and determine a time domain resource corresponding to the time domain index information in the period indicated by the period indication information. If the network device is not notified or configured, the network device may determine the period in an implicit manner. To be specific, the first network device determines, based on the identification information, the sequence indication information, and the frequency domain indication information, the period of the reference signal, the time domain index information corresponding to the identification information, and the time domain resource that corresponds to the time domain index information in the period.

Figure 13:
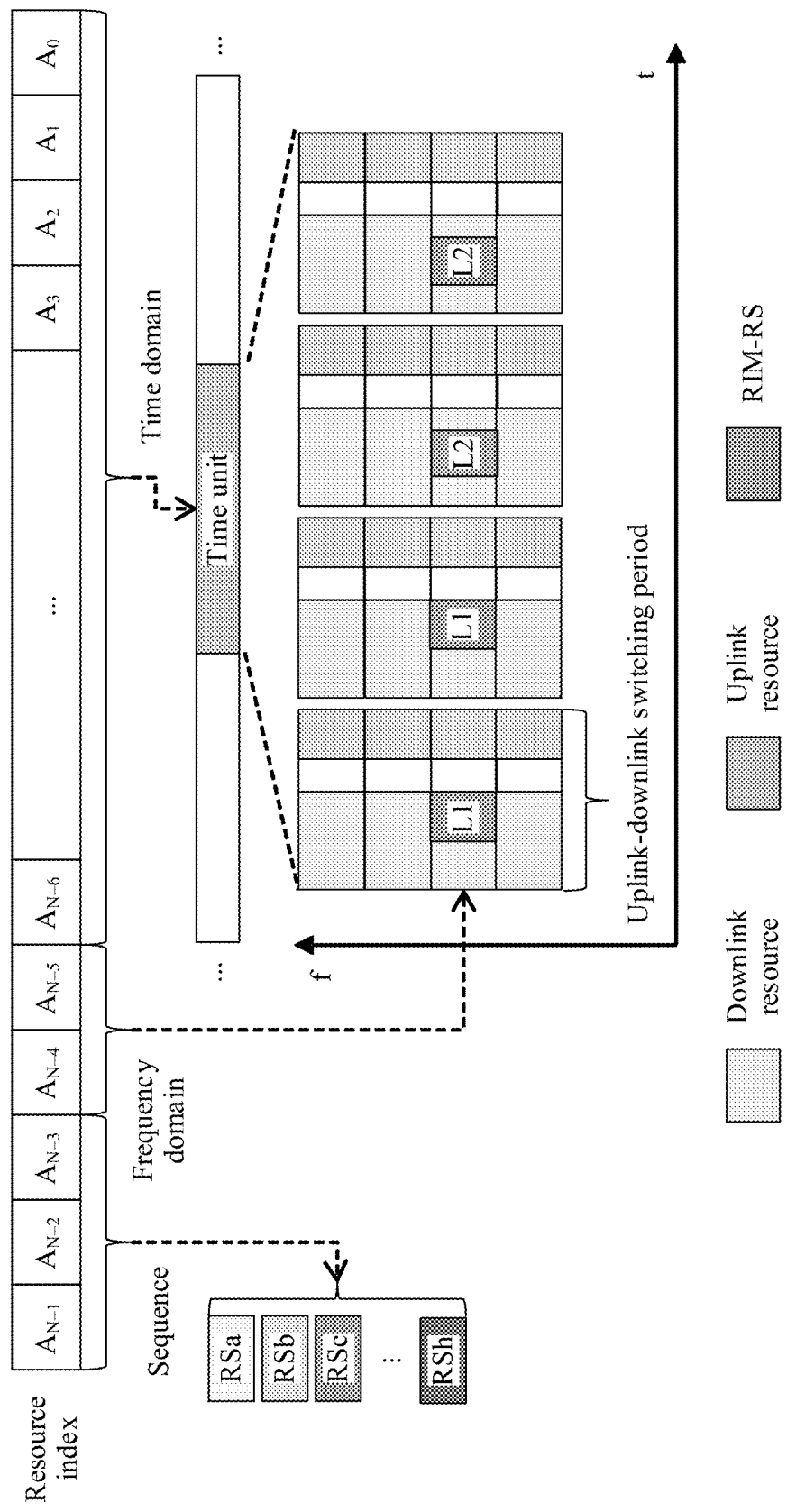
FIG. 13 is a schematic diagram of a mapping relationship between resource index information and resources in different domains according to an embodiment of this application.

For example, as shown in FIG. 13, a mapping relationship between the resource index information and resources in different domains is as follows: The resource index information may be an overall resource index, or may be divided into sequence index information, frequency domain index information, and time domain index information. For example, the resource index includes N bits, which are represented by $A_{N-1}A_{N-2}A_{N-3} \ldots A_1A_0$. It is assumed that a maximum quantity of reference signal sequences is 8, a maximum quantity of frequency domain candidate positions is 4, and a time domain period is $2^{N-5}$ time units in one uplink-downlink switching period. A single uplink-downlink switching period pattern is configured for the network device, and each time unit includes four uplink-downlink switching periods. The sequence index information $N_{seq}$ is three most significant bits of the resource index information, and a specific value $n_{seq}$ of the three bits determines which one of eight sequences is a reference signal sequence sent by the first network device. For example, if a value $n_{seq}$ of the three bits is '011', namely, 3 in decimal notation, the first network device sends a reference signal sequence whose index is 3. The frequency domain index information $N_{freq}$ is the fourth and fifth bits of the resource index information, a specific value $n_{freq}$ of the two bits determines which one of four frequency domain resources is used by the first network device when the first network device sends the reference signal. For example, if a value $n_{freq}$ of the two bits is '01', namely, 1 in decimal notation, the first network device sends the reference signal at a candidate frequency domain resource position whose index is 1. $N_{tu}$ is N−5 least significant bits of the resource index information. A specific value $n_{tu}$ of the N−5 bits determines which one of $2^{N-5}$ time units is a time unit in which the first network device sends the reference signal, in other words, determines a time unit position of the reference signal. Alternatively, it may be considered that the value $n_{tu}$ indicates an index of the time unit, or it is considered that the value indicates an offset between the time unit in which the reference signal is located and a starting position of the period.

In FIG. 13, one time unit includes four uplink-downlink switching periods. This is determined because a repetition number of the reference signal RIM-RS is 2 and there are two reference signal symbol positions. In FIG. 13, an uplink-downlink period of a single pattern is used as an example. If the first network device configures two uplink-downlink switching periods, a quantity of uplink-downlink switching periods included in the time unit is further related to a valid uplink-downlink switching period.

It should be further noted that, in this application, the first network device may determine one or more of the sequence, the frequency domain resource, and the time domain resource of the reference signal based on the identification information. For example, if there is only one candidate frequency domain resource, in this case, $N_{freq}=0$, in other words, the frequency domain resource of the reference signal does not need to be indicated, and is unique. In this case, the frequency domain index information may not be determined based on the identification information, in other words, the frequency domain resource is not determined based on the identification information, and the sequence and the time domain resource of the reference signal corresponding to the identification information are determined based on only the identification information. Similarly, if there is only one candidate sequence of the reference signal, in this case, $N_{seq}=0$, and the sequence corresponding to the reference signal does not need to be indicated. In this case, the sequence index information may not be determined based on the identification information, in other words, the sequence is not determined based on the identification information, and the frequency domain resource and the time domain resource of the reference signal corresponding to the identification information are determined based on only the identification information. In a possible case, there is only one candidate frequency domain resource, and if there is only one candidate sequence of the reference signal, that is, $N_{freq}=0$, and $N_{seq}=0$, which also means that if both the frequency domain resource and the sequence of the reference signal do not need to be indicated, the sequence index information or the frequency domain index information may not be determined based on the identification information, in other words, the sequence or the frequency domain resource is not determined based on the identification information, but the time domain resource of the reference signal corresponding to the identification information is determined based on only the identification information.

Figure 14:
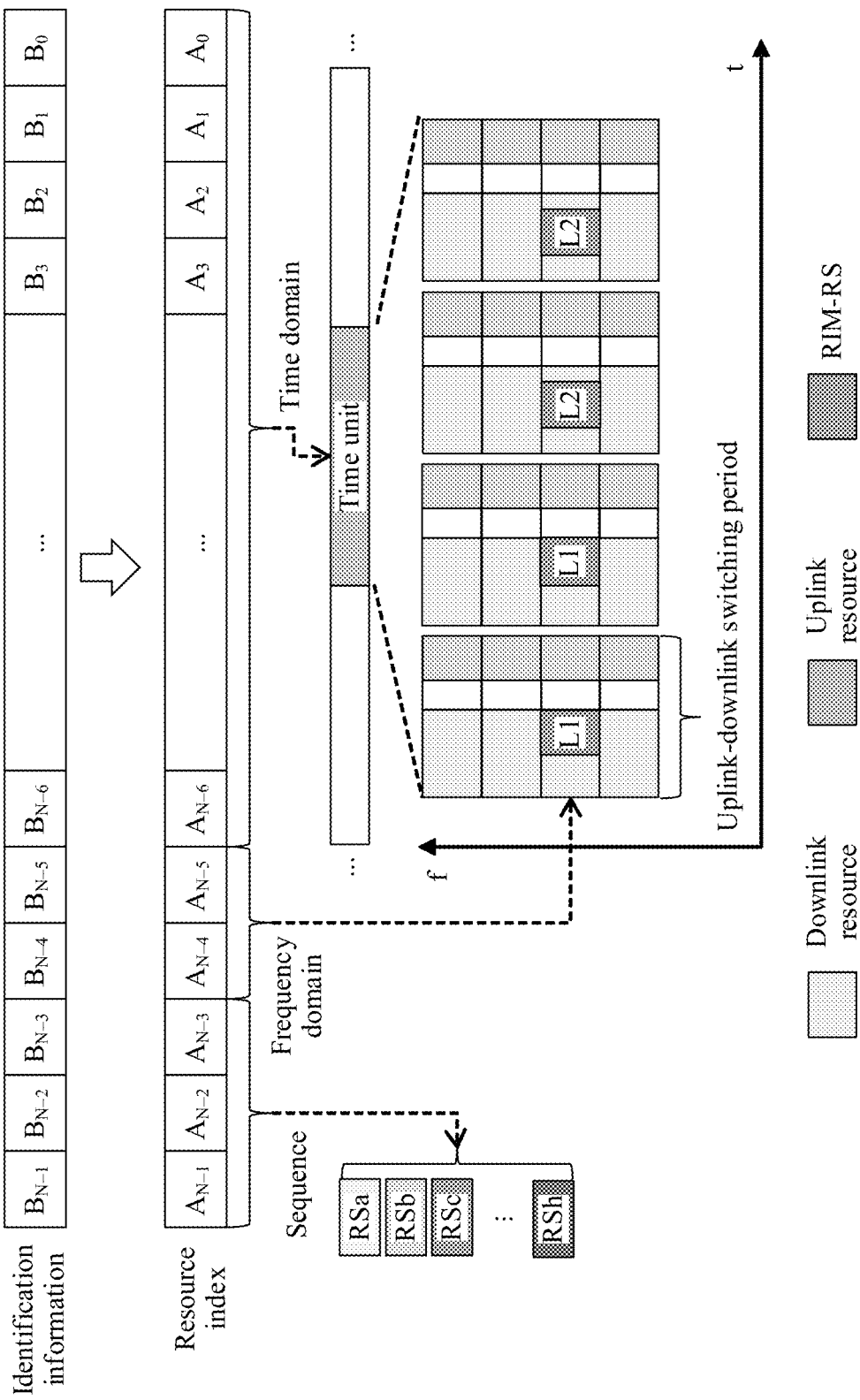
FIG. 14 is a schematic diagram of a mapping relationship between resource index information and resources in different domains according to an embodiment of this application.

The first network device determines the resource index information corresponding to the identification information, in other words, may determine a resource in each domain based on the resource index information. As shown in FIG. 14, the identification information may directly be the resource index information. For example, resource index information of the first network device is information about N bits represented by $A_{N-1}A_{N-2}A_{N-3} \ldots A_1A_0$, and the identification information is $B_{N-1}B_{N-2}B_{N-3} \ldots B_1B_0$. If a value of $A_{N-1}A_{N-2}A_{N-3} \ldots A_1A_0$ is 1101001111, 1101001111 is also a value of a resource index $A_{N-1}A_{N-2}A_{N-3} \ldots A_1A_0$ of the reference signal corresponding to the identification information.

If neither the parameter information nor other information includes the period indication information, the first network device determines a quantity of remaining bits based on a number of bits of the identification information, the sequence index information, and the frequency domain index information, and determines the period based on the quantity S of the remaining bits and $2^S$. Then, the first network device determines a time unit of the reference signal in one period based on values corresponding to the remaining bits.

On a receiver side, the second network device determines a receiving resource based on the parameter information. The receiving resource is equivalent to a {code, frequency, time} resource space that includes a sequence, a frequency domain resource, and a time domain resource and that is determined based on the parameter information. The second network device receives or detects the reference signal on the receiving resource. The second network device determines a transmission resource on which the reference signal is received. A symbol on which the first network device sends the reference signal is determined by using a symbol on which the reference signal is received, and a frequency domain resource on which the reference signal is received is determined. A sequence corresponding to the reference signal is determined based on the reference signal. The second network device determines identification information of the reference signal based on one or more domains in the transmission resource of the reference signal. For a method for determining the identification information, refer to the method for determining the transmission resource by the first network device based on the identification information. For example, the second network device determines the sequence index information based on the sequence of the reference signal, determines the frequency domain index information based on the frequency domain resource of the reference signal, and/or determines the time domain index information based on the time domain resource of the reference signal, and determines the identification information of the first network device based on one or more of the sequence index information, the frequency domain index information, and the time domain index information. In a possible case, a time domain resource corresponding to the receiving resource of the second network device is an uplink resource, and a time domain resource corresponding to the transmission resource of the first network device is a downlink resource. The two resources are different. This is caused by a delay caused by remote transmission.

In conclusion, in the foregoing method, the first network device may determine, based on the identification information and the parameter information, the sequence and the time-frequency resources for sending the reference signal. The parameter information is applicable to both the first network device and the second network device. The second network device may perform receiving or detection in candidate time-frequency resources and a sequence set based on the parameter information, and determine, based on detected sequence and time-frequency resources of the reference signal, the identification information of the first network device that sends the reference signal, to send and receive the reference signal. Further, according to the design of the reference signal in this application, under various different network configurations and detection requirements, the reference signal can be flexibly sent and received when remote interference measurement is performed between the network devices. As the reference signal is flexibly configured, requirements for different quantities of reference signal sequences and different network bandwidths can be met. In addition, the reference signal can be configured according to different repetition enhancement requirements and detection distance requirements, so that network devices in networks with different deployment characteristics can perform remote interference measurement.

Further, in this embodiment of this application, the reference signal may further carry more additional information. For example, the reference signal is used to indicate whether a network device that sends the reference signal is an interfering base station or an interfered base station. For another example, the reference signal is used to indicate whether interference cancellation used by the interfering station is sufficient. Details are described below.

Additional Information of a First Type:

In an application scenario of remote interference measurement, a reference signal may be represented by RIM-RS. The RIM-RS may carry some information used for coordination between network devices, and the information is denoted as the additional information of the first type. The additional information of the first type may be used to distinguish whether a network device that sends the RIM-RS is an interfered base station or an interfering base station. Alternatively, the additional information of the first type is used to distinguish whether the RIM-RS is an RS-1 or an RS-2.

Specifically, the RIM-RS may be classified into two types. One type is sent by the "interfered base station" and is denoted as an RS-1, and the other type is sent by the "interfering base station" and is denoted as an RS-2. In this case, a network device that detects the RIM-RS may know whether the network device that sends the RIM-RS is an interfering base station or an interfered base station, so that an interference cancellation policy may be adjusted. For example, if a network device detects an RS-1 in an entire RIM-RS sending period, it indicates that the network device is likely to cause obvious interference to another network device, and interference cancellation needs to be performed. Some network devices are both interfering base stations and interfered base stations, and may send both an RS-1 and an RS-2.

In this embodiment of this application, the additional information of the first type may be indicated by using time domain index information. In some time periods, RIM-RSs sent and/or received by all network devices are RS-1s. In some other time periods, the RIM-RSs sent and/or received by all the network devices are RS-2s.

The following describes two possible methods for indicating the additional information of the first type, both of which are implemented by using time domain index information.

Method 1: A bit at a first specified position in the time domain index information is determined by reference signal distinguishing information. The reference signal distinguishing information is used to distinguish whether the network device that sends the RIM-RS is an interfered base station or an interfering base station. Alternatively, the reference signal distinguishing information is used to distinguish whether the RIM-RS is an RS-1 or an RS-2.

The reference signal distinguishing information may be configured by a higher-level node or OAM. For example, the higher-level node or OAM may configure a piece of reference signal distinguishing identification information for the network device, to indicate whether the reference signal distinguishing information exists. The first network device may determine a value of the reference signal distinguishing information based on an interference state of the first network device. Considering that the reference signal distinguishing information indicates two types, the reference signal distinguishing information may occupy one bit, and whether the network device that sends the RIM-RS is an interfered base station or an interfering base station or whether the RIM-RS is an RS-1 or an RS-2 is distinguished based on different values of the bit. For example, the value of the bit is 0 (or 1) when the RIM-RS is an RS-1, and the value of the bit is 1 (or 0) when the RIM-RS is an RS-2.

The value of the reference signal distinguishing information is used to determine a time point at which the RIM-RS is sent. Because the values of the bit are different when the RIM-RS is an RS-1 or an RS-2, time domain resources used by the RS-1 and the RS-2 are different. The second network device on the receiver side may also determine, based on different time points at which the RIM-RS is received, whether the received RIM-RS is sent by the interfered base station or the interfering base station.

Figure 15:
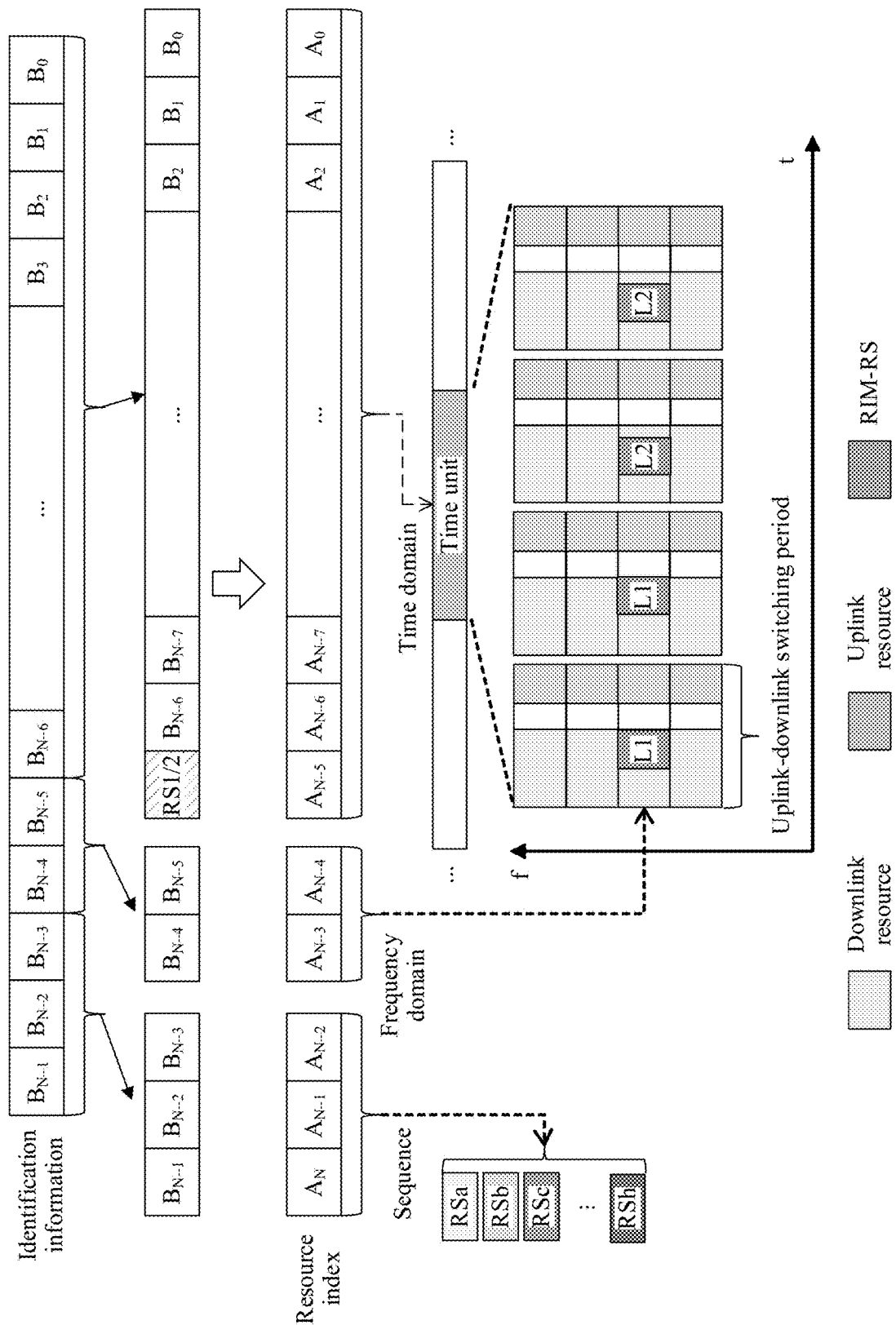
FIG. 15 is a schematic diagram of a method for indicating additional information of a first type according to an embodiment of this application.

The first specified position may be a most significant bit or a least significant bit in the time domain index information, or any specified position. Based on the examples in FIG. 14, as shown in FIG. 15, the most significant bit in the time domain index information is determined by the reference signal distinguishing information, and is represented by RS1/2. This helps to distinguish between the RS-1 and the RS-2 in terms of time. For example, 11 bits including 1 bit of the reference signal distinguishing information RS-1/RS-2 distinguishing bit as a most significant bit and 10 least significant bits of the identification information represent 2048 time units in total. In this case, the first 1024 time units correspond to the RS-1, and the last 1024 time units correspond to the RS-2, so that traversal of RIM-RSs sent by the interfering base station or the interfered base station can be completed more quickly. Certainly, the reference signal distinguishing information "RS-1/RS-2 distinguishing bit" may also be used as a least significant bit for determining a RIM-RS time unit, which is also feasible.

In the method 1, a length of the identification information is less than a length of resource index information. The first network device determines a value of the bit at the first specified position in the time domain index information based on a current interference state, then determines entire resource index information based on the identification information and the value of the bit at the first specified position, or determines index information of three domains, and then determines a transmission resource in each domain based on the resource index information.

Method 2: Different reference signal types are distinguished or whether the network device that sends the reference signal is an interfering base station or an interfered base station is distinguished by using two pieces of identification information.

The two pieces of identification information include first identification information and second identification information. The first identification information corresponds to first time domain index information, and the second identification information corresponds to second time domain index information.

The two pieces of identification information may also be configured by a higher-level node or OAM. The first network device may determine, based on a current interference state, which piece of identification information is used to determine a transmission resource. The first time domain index information and the second time domain index information correspond to different reference signal types respectively, or are used to distinguish whether the network device that sends the reference signal is an interfering base station or an interfered base station. For example, the first time domain index information is used to indicate that the network device that sends the reference signal is an interfering base station, or that the reference signal is an RS-1. The second time domain index information is used to indicate that the network device that sends the reference signal is an interfered base station, or that the reference signal is an RS-2.

In a case 1 of the method 2, both the first time domain index information and the second time domain index information are used to indicate time domain resources of an entire transmission period. The network device may directly determine positions of the time domain resources in the entire transmission period based on the first time domain index information or the second time domain index information. When determining that the network device is an interfering base station, the network device selects the first identification information to determine the transmission resource, and when determining that the network device is an interfered base station, the network device selects the second identification information to determine the transmission resource. Specifically, the network device determines a first time domain resource in the period based on the first time domain index information corresponding to the first identification information, and transmits the reference signal on the first time domain resource. Specifically, the network device determines a second time domain resource in the period based on the second first time domain index information corresponding to the second identification information, and transmits the reference signal on the second time domain resource.

Figure 16:
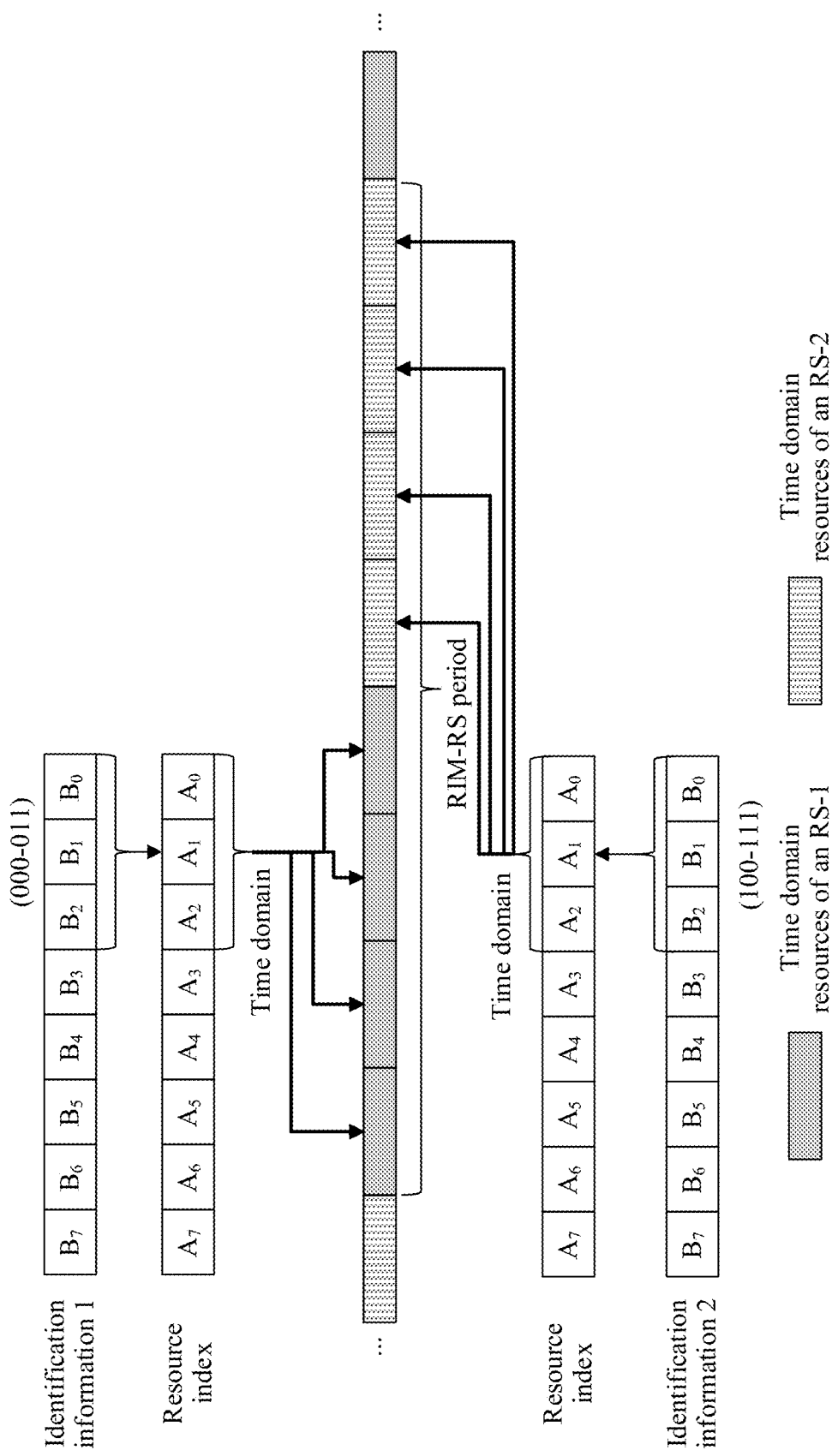
FIG. 16 is a schematic diagram of a method for indicating additional information of a first type according to an embodiment of this application.

For example, as shown in FIG. 16, one period includes eight time units, and values corresponding to the eight time units are 000 to 111 respectively. Three least significant bits $B_2$ to $B_0$ of the first identification information (e.g., identification information 1) correspond to three bits $A_2$ to $A_0$ of the first time domain index information, and the first time domain index information corresponds to first four time units of the period. Three least significant bits $B_2$ to $B_0$ of the second identification information (e.g., identification information 2) correspond to three bits $A_2$ to $A_0$ of the second time domain index information, and the second time domain index information corresponds to the last four time units of the period. A value range of the three least significant bits $B_2$ to $B_0$ of the identification information 1 is different from a value range of the three least significant bits $B_2$ to $B_0$ of the identification information 2, which are 000 to 011 and 100 to 111 respectively, to ensure that the RS-1 and the RS-2 can be distinguished in terms of time.

According to the method in the case 1 of the method 2, the network device may deduce a time length of the entire period from any piece of identification information, and all pieces of identification information may share a same mapping manner. Therefore, implementation is simple. The mapping manner is a mapping relationship between a bit value and a candidate time domain resource in the period.

In the method in the case 1 of the method 2, a quantity of bits of the first identification information is equal to a quantity of bits of the second identification information, or a quantity of bits of the first time domain index information is equal to a quantity of bits of the second time domain index information. This is also determined because periods indicated by the first identification information, the second identification information, the first time domain index information, and the second time domain index information are a same period (namely, the entire transmission period of the reference signal). From a perspective of sending the RIM-RS, in this method, there is no difference between this embodiment and an embodiment 1 However, it should be noted that when the network is notified of/configured with a plurality of pieces of identification information, it should be ensured that a time unit that may be used by the RS-1 is different from a time unit that may be used by the RS-2. From a perspective of receiving the RIM-RS, to enable the second network device that receives the RIM-RS to identify that the RIM-RS is an RS-1 or an RS-2, the second network device may further be notified of/configured with a piece of time range distinguishing information, to distinguish between a time range that may be used by the RS-1 and a time range that may be used by the RS-2. For example, in FIG. 11, to notify that in a period of eight time units, RIM-RSs in the first four time units are RS-1s, and RIM-RSs in the last four time units are RS-2s, time range distinguishing information may be {RS-1: 000-011, RS-2: 100-111}. The time range distinguishing information may also be notifying a ratio, for example, {1:1}, of a time period occupied by one RS-1 to a time period occupied by one RS-2, notifying a position of an end/start time unit of the RS-1 and/or the RS-2, or the like, provided that the second network device can determine, based on a time point at which the RIM-RS is detected, whether the RIM-RS is an RS-1 or an RS-2.

In the description of this specification, distinguishing whether the reference signal is an RS-1 or an RS-2 may be equivalent to distinguishing whether the network device that sends the reference signal is an interfering base station or an interfered base station.

In the method 2, there is another case 2: The first time domain index information is used to indicate a first time domain resource of a first sub-period, and the second time domain index information is used to indicate a second time domain resource of a second sub-period. The first sub-period and the second sub-period form the entire transmission period, namely, the entire period. The network device can determine a position in the first sub-period based on the first time domain index information, and then determine positions of the time domain resources in the entire transmission period based on a first offset. The network device can determine a position in the second sub-period based on the second time domain index information, and then determine the positions of the time domain resources in the entire transmission period based on a second offset. The first offset is determined by the second sub-period, and the second offset is determined by the first sub-period.

Figure 17:
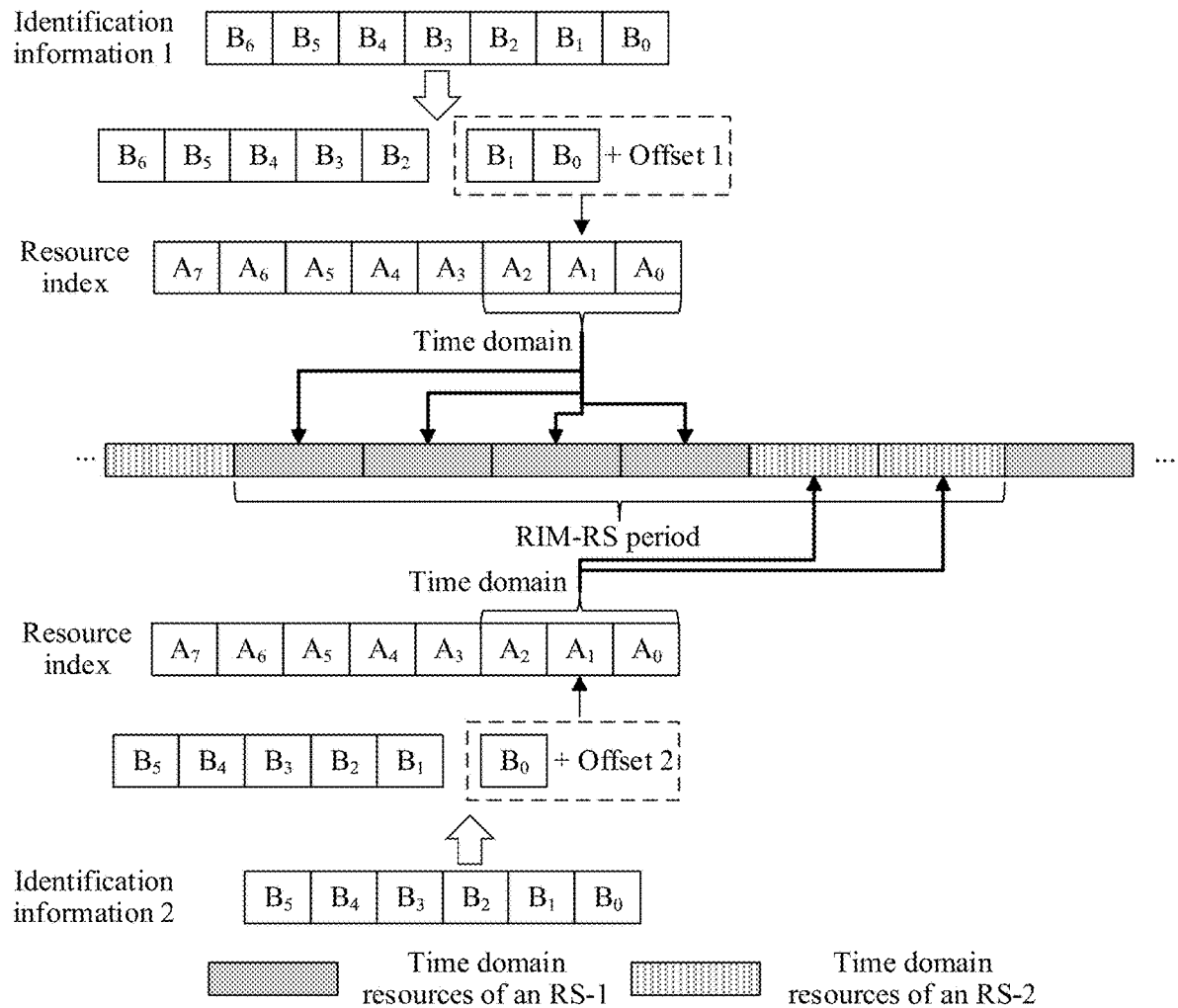
FIG. 17 is a schematic diagram of a method for indicating additional information of a first type according to an embodiment of this application.

For example, as shown in FIG. 17, one period includes six time units, a first sub-period includes four time units, and a second sub-period includes two time units. The first identification information (namely, the identification information 1) has seven bits, and values of two bits (for example, $N_{tu1}=2$ least significant bits) indicate a position of the reference signal in the first sub-period (four time units). For example, 00 represents the first time unit in the four time units, and 01 indicates the second time unit in the four time units. The second identification information (namely, the identification information 2) has six bits, and a value of one bit (for example, $N_{tu2}=1$ least significant bit) indicates a position of the reference signal in the second sub-period (two time units). For example, 0 represents the first time unit in the two time units in the second sub-period, and 1 represents the second time unit in the two time units in the second sub-period. $N_{tu1}$ And $N_{tu2}$ are respectively a quantity of bits needed to represent a period of an RS-1 in the first sub-period and a quantity of bits needed to represent a period of an RS-2 in the second sub-period. The entire transmission period of the reference signal is a sum of the period of the RS-1 and the period of the RS-2, and there are a total of six time units.

The six time units may be indicated by three least significant bits of a resource index, namely, time domain resource indexes $A_2$ to $A_0$. When the resource index information (time domain resource index information) is determined based on the identification information, for the RS-1, the network device may determine a first time domain resource by using first time domain index information $B_1B_0$ corresponding to the first identification information and a first offset value (denoted as an offset 1). Optionally, the time domain resource indexes $A_2$ to $A_0$ may be first determined, and then the first time domain resource is further determined. The first time domain resource is one of the first four time units. For the RS-2, the network device may determine a second time domain resource by using the second time domain index information $B_0$ corresponding to the second identification information and a second offset value (denoted as an offset 2). Optionally, the time domain resource indexes $A_2$ to $A_0$ may be first determined, and then the second time domain resource is further determined. The second time domain resource is one of the last two time units.

In this method, an offset value corresponding to the identification information 2 may be determined based on the first sub-period corresponding to the identification information 1, or an offset value corresponding to the identification information 1 may be determined based on the second sub-period corresponding to the identification information 2. In a feasible implementation, a value of the offset 1 corresponding to the identification information 1 is 0, and a value of the offset 2 corresponding to the identification information 2 is $2^{N_{tu1}}$. In FIG. 17, if $2^{N_{tu1}}=2$, the value of the offset 2 is 4. When a time domain position indicated by the second time domain index information $B_0$ is the first time unit, the value 4 of the offset 2 is added to obtain that the time domain position is the fifth time unit and corresponds to a position in the entire transmission period that includes six time units. Particularly, when the value of the offset 1 corresponding to the identifier information 1 is 0, the offset 1 may be omitted. In other words, no offset value needs to be used when the time domain resource corresponding to the identifier information 1 is calculated. Similar, when the value of the offset 2 corresponding to the identifier information 2 is 0, the offset 2 may be omitted. In other words, no offset value needs to be used when the time domain resource corresponding to the identifier information 2 is calculated.

In this way, the first identification information only needs to indicate a time domain position in the first sub-period, and the first sub-period is usually less than the entire transmission period. Therefore, compared with a case in which the first identification information needs to indicate the time domain positions in the entire transmission period, a relatively small number of bits are needed, and signaling overheads can be reduced. The second identification information only needs to indicate a time domain position in the second sub-period, and the second sub-period is usually less than the entire transmission period. Therefore, compared with a case in which the second identification information needs to indicate the time domain positions in the entire transmission period, a relatively small number of bits are needed, and the signaling overheads can be reduced.

It should be noted that, in the case 2 of the method 2, the quantity of bits of the first identification information is different from the quantity of bits of the second identification information. This is also due to the fact that the periods indicated by the first identification information and the second identification information are sub-periods of the first identification information and the second identification information. Therefore, in global parameters of the first identification information and the second identification information, $N_{tu}$ is different. Optionally, different pieces of identification information are configured with/notified of different $N_{tu}$ when the network device is configured/notified. Alternatively, the network device determines different $N_{tu}$ based on a quantity of bits of the identification information, $N_{seq}$, and $N_{freq}$. That is, a same $N_{tu}$ cannot be used for an RS-1 and an RS-2 at the same time. Therefore, different pieces of identification information correspond to different $N_{tu}$. For example, an RS-1 corresponding to the identification information 1 corresponds to $N_{tu1}$, and an RS-2 corresponding to the identification information 2 corresponds to $N_{tu2}$. $N_{tu1}$ and $N_{tu2}$ may be notified/configured by OAM or a higher-level node, or may be calculated based on the quantity of bits of the identification information 1 or the quantity of bits of the identification information 2 together with $N_{seq}$ and $N_{freq}$.

In the case 2 of the method 2, from a perspective of sending the RIM-RS, when the time domain position of the RS-1 in each period is determined, a position of the RS-1 in the first sub-period needs to be considered, and impact of the second sub-period of the RS-2 needs to be considered. In terms of an entire time domain, an actual transmission period of the RS-1 is a sum of the first sub-period of the RS-1 and the second sub-period of the RS-2. This is the same for the RS-2. For example, a time unit position of an actual transmission period of the RS-2 may be determined by using both "the position of the RS-2 in the second sub-period" and the second offset value, and the second offset value is determined based on the period of the RS-1.

From a perspective of receiving the RIM-RS, provided that periods of RS-1s of all the network devices are the same, in other words, first sub-periods are the same, and periods of RS-2s of all the network devices are the same, in other words, second sub-periods are the same, the second network device may clearly know time points at which the RS-1s are received and time points at which the RS-2s are received, and may not need additional indication information distinguishing.

In the foregoing described examples, a time domain sequence in which an RS-1 is located before an RS-2 is used as an example. However, a time domain resource sequence of the RS-1 and the RS-2 is not limited in this application.

Additional Information of a Second Type:

In an application scenario of remote interference measurement, a reference signal may be represented by RIM-RS. The RIM-RS may carry some information used for coordination between network devices, and the information is denoted as the additional information of the second type. The second additional information of the second type may be used to distinguish whether a network device that sends the RIM-RS considers that interference cancellation used by an interfering base station is sufficient.

In this embodiment of this application, the additional information of the second type may be indicated by using sequence index information. If some sequences are used, for all network devices, the network device that sends the RIM-RS considers that interference cancellation used by the interfering base station is sufficient. If some other sequences are used, for all the network devices, the network device that sends the RIM-RS considers that interference cancellation used by the interfering base station is insufficient.

The following describes two possible methods for indicating the additional information of the second type, both of which are implemented by using sequence index information.

Method a: A bit at a second specified position in the sequence index information is determined by interference cancellation state indication information. The interference cancellation state indication information is used to distinguish whether interference cancellation used by the network device that sends the RIM-RS is sufficient.

The interference cancellation state indication information may be configured by a higher-level node or OAM. For example, the higher-level node or OAM may configure a piece of interference cancellation state distinguishing identification information for the network device, to indicate whether the interference cancellation state indication information exists. The first network device may determine a value of the interference cancellation state indication information based on an interference state of the first network device. Considering that the interference cancellation state indication information indicates two states, the interference cancellation state indication information may occupy one bit, and whether the network device that sends the RIM-RS considers that interference cancellation used by the interfering base station is sufficient is distinguished based on different values of the bit.

For the interfering base station, two states of the interference cancellation state indication information may be used to indicate that the interfering base station that receives the reference signal is required to execute a further interference cancellation policy, or that the interfering base station that receives the reference signal is not required to execute a further interference cancellation policy.

Figure 18:
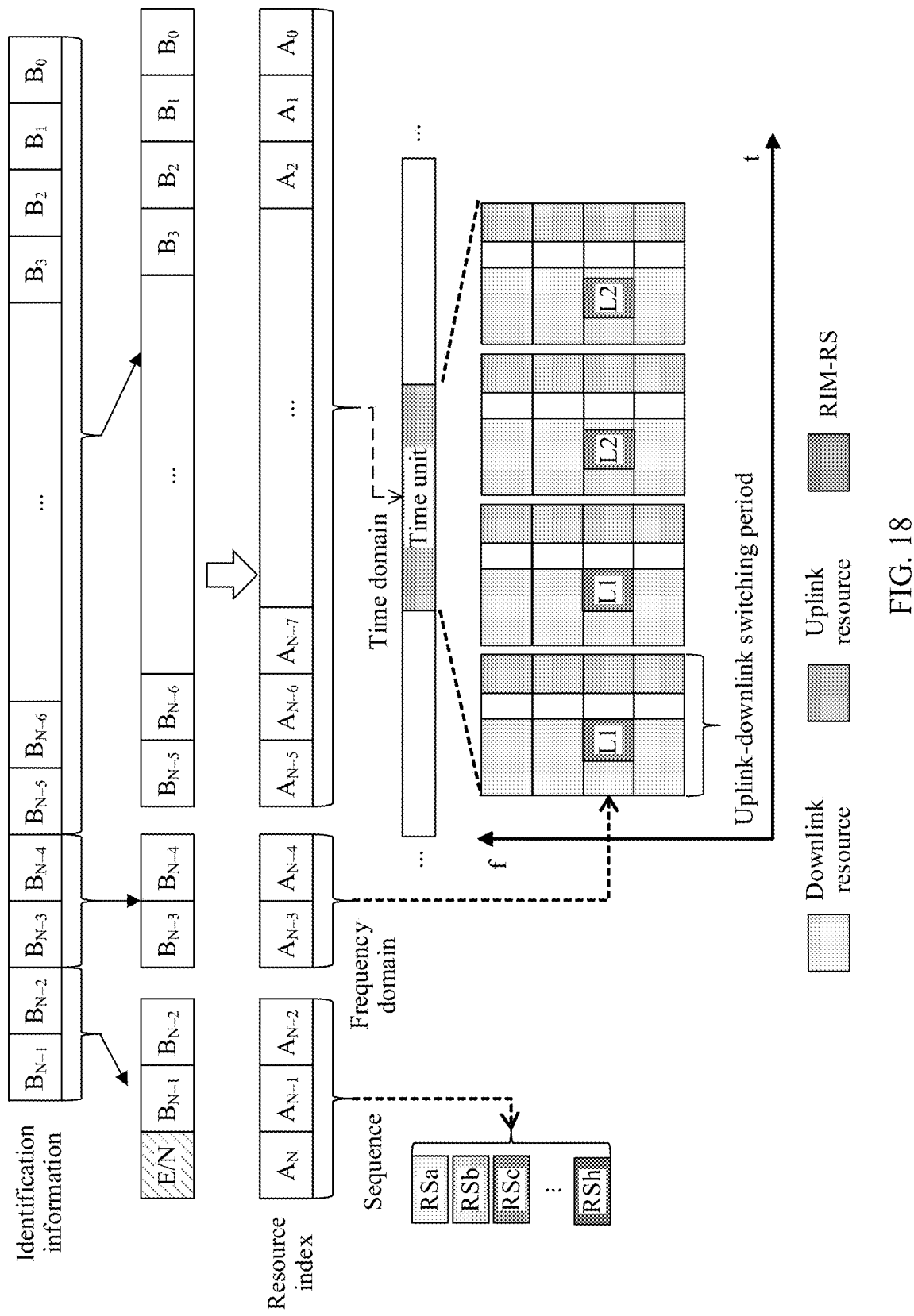
FIG. 18 is a schematic diagram of a method for indicating additional information of a second type according to an embodiment of this application.

The second specified position may be a most significant bit or a least significant bit in the sequence index information, or any specified position. Based on the examples in FIG. 14, as shown in FIG. 18, the most significant bit in the sequence index information is determined by the interference cancellation state indication information, and is represented by E/N. For example, the interference cancellation state indication information occupies one bit, and the network device determines, based on an interference state, whether a value of the one bit is 1 or 0. For an interfered base station, when the network device that sends the reference signal considers that interference cancellation of the interfering base station is insufficient, the value of the bit is 0 (or 1). When the network device that sends the reference signal considers that interference cancellation of the interfering base station is sufficient, the value of the bit is 1 (or 0).

In the method a, the length of the identification information is less than the length of resource index information. The first network device determines a value of the bit at the second specified position in the sequence index information based on a current interference state, then determines entire resource index information based on the identification information and the value of the bit at the second specified position, or determines index information of three domains, and then determines a transmission resource in each domain based on the resource index information.

According to the method a, two interference cancellation states may be distinguished in a code division manner. The interference cancellation state indication information is used to determine a sequence used by the RIM-RS. Because the bit has a different value when the interference cancellation state is different, sequences used by the network device to send RIM-RSs representing interference cancellation states are different. In addition, the second network device on the receiver side may determine, based on different sequences of received RIM-RSs, meanings of interference cancellation states indicated by the received RIM-RSs, for example, whether interference cancellation is sufficient.

Method b: Different interference cancellation states are distinguished by using two pieces of identification information.

The two pieces of identification information include first identification information and second identification information. The first identification information corresponds to first sequence index information, and the second identification information corresponds to second sequence index information. The first sequence index information and the second sequence index information may be two different ranges of the entire sequence index information.

The two pieces of identification information may also be configured by a higher-level node or OAM. The first network device may determine, based on a current interference state, which piece of identification information is used to determine a transmission resource. The first sequence index information and the second sequence index information correspond to different interference cancellation states respectively. For example, the first sequence index information is used to indicate that a network device that sends a reference signal considers that interference cancellation used by an interfering base station is sufficient. The second sequence index information is used to indicate that the network device that sends the reference signal considers that interference cancellation used by the interfering base station is insufficient.

Similar to the two cases in the foregoing method 2, both the first sequence index information and the second sequence index information may be used to indicate an entire sequence resource, or the first sequence index information is used to indicate a sequence resource in a first range, and the second sequence index information is used to indicate a sequence resource in a second range. The first network device may directly determine two sequence resources based on the first sequence index information and the second sequence index information, or may determine a first sequence based on the first sequence index information and a third offset, and determine a second sequence based on the second sequence index information and a fourth offset. For specific implementation of the method, refer to the descriptions of the two cases in the foregoing method 2. Details are not described herein again. For example, the sequence of the reference signal includes a first sequence and a second sequence, and one or both of the first sequence and the second sequence may be used. The network device determines, from candidate sequences based on the first sequence index information, the first sequence corresponding to the first sequence index information, and determines, from the candidate sequences based on the second sequence index information, the second sequence corresponding to the second sequence index information. Alternatively, with reference to an offset, the network device determines, from candidate sequences based on the first sequence index information and a third offset, the first sequence corresponding to the first sequence index information, and/or determines, from the candidate sequences based on the second sequence index information and a fourth offset, the second sequence corresponding to the second sequence index information.

In this way, the first identification information only needs to indicate a sequence in the sequence resource in the first range, and the sequence resource in the first range is usually less than the entire sequence resource. Therefore, compared with a case in which the first identification information needs to indicate a sequence in the entire sequence resource, a relatively small number of bits are needed, and the signaling overheads can be reduced. The second identification information only needs to indicate a sequence in the sequence resource in the second range, and the sequence resource in the second range is usually less than the entire sequence resource. Therefore, compared with a case in which the second identification information needs to indicate a sequence in the entire sequence resource, a relatively small number of bits are needed, and the signaling overheads can be reduced.

In a possible design, the additional information of the first type and the additional information of the second type may be combined for indication. For details about the method for indicating the additional information of the first type and the method for indicating the additional information of the second type, refer to the foregoing descriptions.

The network device may distinguish between different types by using four pieces of identification information, including different reference signal types and different interference cancellation states.

For example, the four pieces of identification information include first identification information, second identification information, third identification information, and fourth identification information. The time domain index information includes first time domain index information and second time domain index information. The sequence index information includes first sequence index information and second sequence index information. The first identification information corresponds to the first time domain index information and the first sequence index information, the second identification information corresponds to the second time domain index information and the first sequence index information, the third identification information corresponds to the first time domain index information and the second sequence index information, and the fourth identification information corresponds to the second time domain index information and the second sequence index information.

For another example, a function indicating the additional information of the second type generally needs to be sent by an interfered base station, in other words, an RS-1 carries the additional information of the second type, but an RS-2 does not carry the additional information of the second type. In this case, the identification information includes the third identification information, and the sequence index information includes the first sequence index information and the second sequence index information. The first identification information corresponds to the first time domain index information and the first sequence index information, the second identification information corresponds to the second time domain index information, and the third identification information corresponds to the first time domain index information and the second sequence index information.

The network device may determine, based on an interference state of the network device, time units in which a RIM-RS needs to be sent, specifically, determine whether an RS-1 or an RS-2 is to be sent, and the network device may determine a sequence for sending the RIM-RS, specifically, determine to send an RS-E and an RS-N. The RS-E indicates that interference cancellation is sufficient. The RS-N indicates that interference cancellation is insufficient or an interference cancellation policy does not need to be further improved.

In an application scenario in which the additional information of the first type and the additional information of the second type are combined for indication, the parameter information configured for the network device may include the following forms.

(1) One piece of identification information is configured for the network device, and when a time domain resource of the RIM-RS is determined, the time domain resource further needs to be determined based on a bit of reference signal distinguishing information at a first specified position. When code domain resources of the RS-1 and the RS-2 are determined, the code domain resources further need to be determined based on a bit of interference cancellation state indication information at a second specified position, or when a code domain resource of the RS-1 is determined, the code domain resource further needs to be determined based on a bit of interference cancellation state indication information at a second specified position.

(2) Two pieces of identification information are configured for the network device, and correspond to the RS-1 and the RS-2 respectively. When code domain resources of the RS-1 and the RS-2 are determined, the code domain resources further need to be determined based on a bit of interference cancellation state indication information at a second specified position, or when a code domain resource of the RS-1 is determined, the code domain resource further needs to be determined based on a bit of interference cancellation state indication information at a second specified position.

(3) Two pieces of identification information are configured for the network device, and correspond to the RS-E and the RS-N respectively. When a time domain resource of the RIM-RS is determined, the time domain resource of the RIM-RS further needs to be determined based on a bit of reference signal distinguishing information at a first specified position. The RS-E and the RS-N may take effect at any time point, or may take effect only at a time point corresponding to RS-1.

(4) Four pieces of identification information are configured for the network device, correspond to an RS-1E, an RS-1N, an RS-2E and an RS-2N respectively, and correspond to a case of interfered base station+sufficient, a case of interfered base station+insufficient, a case of interfered base station+sufficient, and a case of interfered base station+insufficient respectively. Alternatively, three pieces of identification information are configured/notified for a base station, correspond to an RS-1E, an RS-1N, and an RS-2 respectively, and correspond to a case of interfered base station+sufficient, a case of interfered base station+insufficient, and a case of interfering base station (or interfering base station+sufficient) respectively.

According to the additional information of the first type, information of distinguishing an interfering base station or an interfered base station may be further carried in a RIM-RS sending/receiving process, or information indicating that the reference signal is an RS-1 or an RS-2 may be carried. According to the additional information of the second type, information indicating whether current interference cancellation is sufficient may be further carried in the RIM-RS sending/receiving process. The additional information of the first type and the additional information of the second type help implement more accurate inter-base station interference coordination.

Figure 19:
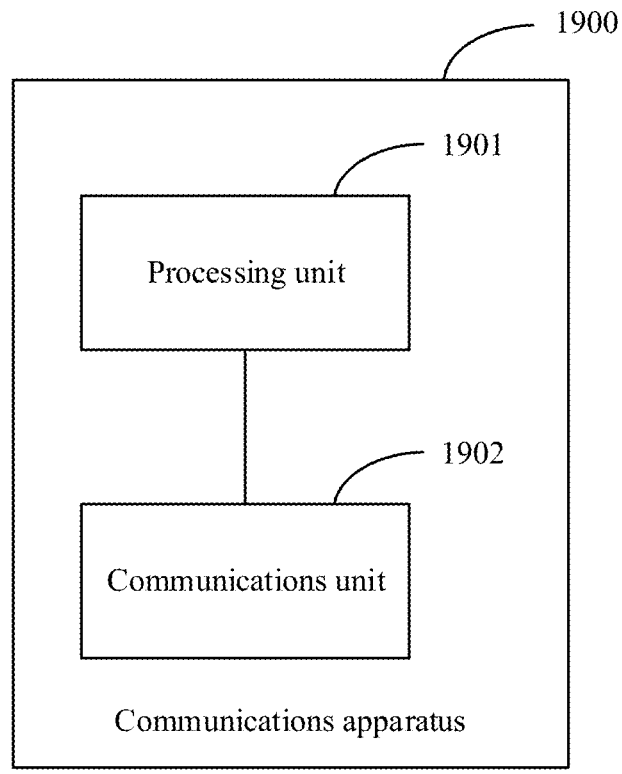
FIG. 19 is a schematic diagram of a structure of a communications apparatus according to an embodiment of this application.

Based on a same concept as the foregoing method embodiments, as shown in FIG. 19, an embodiment of this application further provides a communications apparatus 1900. The communications apparatus 1900 is configured to perform the operations performed by the first network device or the second network device in the foregoing method embodiments. The communications apparatus 1900 includes a processing unit 1901 and a communications unit 1902.

When the operations performed by the first network device in the foregoing method embodiments are performed:

the processing unit 1901 is configured to determine a transmission resource of a reference signal based on identification information and parameter information, where the transmission resource includes one or more of a sequence, a frequency domain resource, and a time domain resource of the reference signal, the identification information is used to identify a network device, the parameter information includes sequence indication information and frequency domain indication information, the sequence indication information is used to indicate one or more candidate sequences, and the frequency domain indication information is used to indicate one or more candidate frequency domain resources; and the communications unit 1902 is configured to send the reference signal on the transmission resource.

Optionally, the processing unit 1901 is configured to:

determine, from the candidate sequences, the sequence of the reference signal corresponding to the identification information; and/or determine, from the candidate frequency domain resources, the frequency domain resource corresponding to the identification information; and/or determine the time domain resource based on the identification information.

Optionally, the time domain resource includes one or more uplink-downlink switching periods.

The parameter information further includes one or more of first indication information, second indication information, or third indication information.

The first indication information is used to indicate a quantity of times of repeatedly sending the reference signal.

The second indication information is used to indicate a position, of a symbol that carries the reference signal, in an uplink-downlink switching period.

The third indication information is used to indicate an uplink-downlink switching period that is used for carrying the reference signal and that is in a first uplink-downlink switching period and a second uplink-downlink switching period, where the first uplink-downlink switching period and the second uplink-downlink switching period are adjacent in time domain, and the first uplink-downlink switching period and the second uplink-downlink switching period have different patterns.

Optionally, the processing unit 1901 is configured to:

determine sequence index information corresponding to the identification information, and determine, from the candidate sequences, the sequence of the reference signal corresponding to the sequence index information.

Optionally, the processing unit 1901 is configured to:

determine frequency domain index information corresponding to the identification information, and determine, from the candidate frequency domain resources, the frequency domain resource corresponding to the frequency domain index information.

Optionally, the processing unit 1901 is configured to:

determine time domain index information corresponding to the identification information; and determine the time domain resource that corresponds to the time domain index information in a period indicated by period indication information, where the period indication information is used to indicate a period of sending the reference signal.

Optionally, the processing unit 1901 is configured to:

determine a period of the reference signal based on the identification information, the sequence indication information, and the frequency domain indication information;

determine time domain index information corresponding to the identification information; and determine the time domain resource that corresponds to the time domain index information in the period.

Optionally, a bit at a first specified position in the time domain index information is determined by reference signal distinguishing information.

Optionally, the identification information includes first identification information and second identification information. The time domain index information includes first time domain index information and second time domain index information. The first identification information corresponds to the first time domain index information, and the second identification information corresponds to the second time domain index information.

Optionally, the time domain resource includes a first time domain resource and a second time domain resource.

The processing unit 1901 is configured to:

determine the first time domain resource in the period based on the first time domain index information, and/or determine the second time domain resource in the period based on the second time domain index information.

Optionally, the time domain resource includes a first time domain resource and a second time domain resource.

The processing unit 1901 is configured to:

determine the first time domain resource in the period based on the first time domain index information and a first offset, and/or determine the second time domain resource in the period based on the second time domain index information and a second offset.

Optionally, a bit at a second specified position in the sequence index information is determined by interference cancellation state indication information.

Optionally, the identification information includes first identification information and second identification information. The sequence index information includes first sequence index information and second sequence index information. The first identification information corresponds to the first sequence index information, and the second identification information corresponds to the second sequence index information.

Optionally, the identification information includes third identification information and fourth identification information, and the sequence index information includes first sequence index information and second sequence index information, where the first identification information corresponds to the first time domain index information and the first sequence index information;

the second identification information corresponds to the second time domain index information and the first sequence index information;

the third identification information corresponds to the first time domain index information and the second sequence index information; and the fourth identification information corresponds to the second time domain index information and the second sequence index information.

Alternatively, the identification information includes third identification information, and the sequence index information includes first sequence index information and second sequence index information, where the first identification information corresponds to the first time domain index information and the first sequence index information;

the second identification information corresponds to the second time domain index information; and the third identification information corresponds to the first time domain index information and the second sequence index information.

Optionally, the sequence includes a first sequence and a second sequence.

The processing unit 1901 is configured to:

determine, from the candidate sequences based on the first sequence index information, the first sequence corresponding to the first sequence index information, and/or determine, from the candidate sequences based on the second sequence index information, the second sequence corresponding to the second sequence index information.

Optionally, the sequence includes a first sequence and a second sequence.

The processing unit 1901 is configured to:

determine, from the candidate sequences based on the first sequence index information and a third offset, the first sequence corresponding to the first sequence index information, and/or determine, from the candidate sequences based on the second sequence index information and a fourth offset, the second sequence corresponding to the second sequence index information.

When the operations performed by the second network device in the foregoing method embodiments are performed:

the processing unit 1901 is configured to determine a receiving resource based on parameter information, where the parameter information includes sequence indication information and frequency domain indication information, the sequence indication information is used to indicate one or more candidate sequences, and the frequency domain indication information is used to indicate one or more candidate frequency domain resources; and the communications unit 1902 is configured to receive the reference signal on the receiving resource.

Optionally, the processing unit 1901 is further configured to:

determine a transmission resource of the reference signal, where the transmission resource includes one or more of a sequence, a frequency domain resource, and a time domain resource that correspond to the reference signal; and determine identification information of the reference signal based on the transmission resource of the reference signal, where the identification information is used to identify a network device that sends the reference signal.

Optionally, the processing unit 1901 is configured to:

determine sequence index information based on the sequence of the reference signal, determine frequency domain index information based on the frequency domain resource of the reference signal, and/or determine time domain index information based on the time domain resource of the reference signal; and determine the identification information based on one or more of the sequence index information, the frequency domain index information, and the time domain index information.

Figure 20:
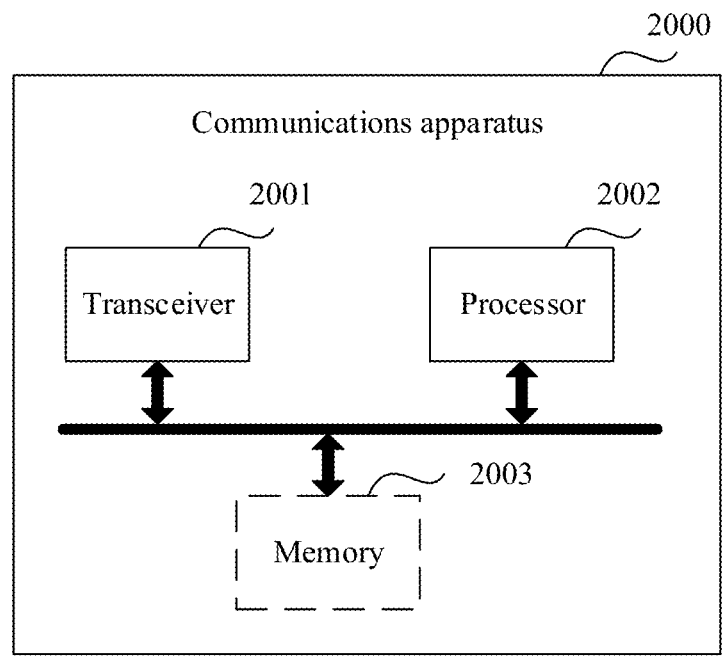
FIG. 20 is a schematic diagram of a structure of a communications apparatus according to an embodiment of this application.

Based on a same concept as the foregoing method embodiments, as shown in FIG. 20, an embodiment of this application further provides a communications apparatus

2000. The communications apparatus 2000 is configured to implement the operations performed by the first network device and/or the second network device in the foregoing method embodiments.

The communications apparatus 2000 includes a transceiver 2001, a processor 2002, and a memory 2003. The memory 2003 is optional. The transceiver 2001 is configured to perform message or signaling transmission with another communications device, for example, receive an RRC message from a source cell. The processor 2002 is coupled to the memory 2003, and is configured to invoke a program in the memory 2003. When the program is executed, the processor 2002 is enabled to perform the operations performed by the first network device or the second network device in the foregoing method embodiments. The memory 2003 is configured to store the program executed by the processor 2002. The function module processing unit 1901 in FIG. 19 may be implemented by using the processor 2002, and the communications unit 1902 may be implemented by using the transceiver 2001.

When the functions of the first network device are executed, for example, the processor 2002 performs the following operation: determining a transmission resource of a reference signal based on identification information and parameter information, where the transmission resource includes one or more of a sequence, a frequency domain resource, and a time domain resource of the reference signal, the identification information is used to identify a network device, the parameter information includes sequence indication information and frequency domain indication information, the sequence indication information is used to indicate one or more candidate sequences, and the frequency domain indication information is used to indicate one or more candidate frequency domain resources.

When the functions of the first network device are executed, for example, the processor 2002 performs the following operation: determining a receiving resource based on parameter information, where the parameter information includes sequence indication information and frequency domain indication information, the sequence indication information is used to indicate one or more candidate sequences, and the frequency domain indication information is used to indicate one or more candidate frequency domain resources.

The processor 2002 may further perform another operation or function performed by the first network device or the second network device in the foregoing method embodiments, and details are not repeated.

The processor 2002 may be a central processing unit (CPU), a network processor (NP), or a combination of a CPU and an NP.

The processor 2002 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 2003 may include a volatile memory, for example, a random-access memory (RAM). The memory 2003 may alternatively include a non-volatile memory, for example, a flash memory, a hard disk drive (HDD), or a solid-state drive (SSD). The memory 2003 may further include a combination of the foregoing types of memories.

Some or all of the operations and functions that are performed by the first network device and that are described in the foregoing method embodiments of this application, or some or all of the operations and functions that are performed by the second network device and that are described in the foregoing method embodiments of this application may be completed by using a chip or an integrated circuit.

To implement the functions of the communications apparatus in FIG. 19 or FIG. 20, an embodiment of this application further provides a chip, including a processor and configured to support the communications apparatus in implementing the functions of the first network device or the second network device in the foregoing method embodiments. In a possible design, the chip is connected to a memory or the chip includes a memory, and the memory is configured to store a program instruction and data that are necessary for the communications apparatus.

An embodiment of this application provides a computer storage medium that stores a computer program. The computer program includes an instruction used to perform the foregoing method embodiments.

An embodiment of this application provides a computer program product including an instruction. When the computer program product runs on a computer, the computer is enabled to perform the foregoing method embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (e.g., system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A communication method, comprising:
   determining a period of a reference signal based on identification information, sequence indication information, and frequency domain indication information, wherein the identification information identifies a network device, the sequence indication information indicates one or more candidate sequences, and the frequency domain indication information indicates one or more candidate frequency domain resources;
   determining time domain index information corresponding to the identification information;
   determining a time domain resource of the reference signal that corresponds to the time domain index information in the period; and
   sending the reference signal on a transmission resource, wherein the transmission resource comprises a sequence, a frequency domain resource, and the time domain resource of the reference signal.

2. The method according to claim 1, further comprising:
   determining, from the candidate sequences, the sequence of the reference signal corresponding to the identification information;
   determining, from the candidate frequency domain resources, the frequency domain resource corresponding to the identification information;
   determining the time domain resource based on the identification information; or
   a combination thereof.

3. The method according to claim 2, wherein the determining, from the candidate sequences, the sequence of the reference signal corresponding to the identification information comprises:
   determining sequence index information corresponding to the identification information, and determining, from the candidate sequences, the sequence of the reference signal corresponding to the sequence index information.

4. The method according to claim 3, wherein a value of a most significant bit in the sequence index information is determined by interference cancellation state indication information.

5. The method according to claim 2, wherein the determining, from the candidate frequency domain resources, the frequency domain resource corresponding to the identification information comprises:
   determining frequency domain index information corresponding to the identification information, and determining, from the candidate frequency domain resources, the frequency domain resource corresponding to the frequency domain index information.

6. The method according to claim 1, wherein the time domain resource is in one or more uplink-downlink switching periods;
   the time domain resource of the reference signal is determined further based on one or more of first indication information, second indication information, or third indication information;
   the first indication information indicates a quantity of times of repeatedly sending the reference signal;
   the second indication information indicates a position, of a symbol that carries the reference signal, in an uplink-downlink switching period; and
   the third indication information indicates an uplink-downlink switching period for carrying the reference signal and that is in a first uplink-downlink switching period and a second uplink-downlink switching period.

7. The method according to claim 1, wherein the identification information comprises first identification information and second identification information; the time domain index information comprises first time domain index information and second time domain index information; and the first identification information corresponds to the first time domain index information, and the second identification information corresponds to the second time domain index information; wherein the first time domain index information and the second time domain index information distinguish different reference signal types.

8. The method according to claim 7, wherein the time domain resource comprises a first time domain resource and a second time domain resource, and the determining the time domain resource of the reference signal that corresponds to the time domain index information in the period comprises:
   determining the first time domain resource in a first sub-period of the period based on the first time domain index information and a first offset, determining the second time domain resource in a second sub-period of the period based on the second time domain index information and a second offset, or a combination thereof;
   wherein the period consists of the first sub-period and the second sub-period, the first offset is determined by the second sub-period, and the second offset is determined by the first sub-period.

9. A communication method, comprising:
   determining a receiving resource based on parameter information, wherein the parameter information comprises sequence indication information and frequency domain indication information, the sequence indication information indicates one or more candidate sequences, and the frequency domain indication information indicates one or more candidate frequency domain resources;
   receiving a reference signal on the receiving resource;
   determining a time domain resource of the reference signal in a period, wherein the period is associated with identification information, sequence indication information, and frequency domain indication information, the identification information identifies a network device that sends the reference signal;
   determining time domain index information corresponding to the time domain resource of the reference signal; and
   determining the identification information based on the time domain index information.

10. The method according to claim 9, wherein the method further comprises:
  determining one or more of a sequence, a frequency domain resource, and a time domain resource that correspond to the reference signal; and
  determining the identification information based on the time domain index information comprising:
  determining the identification information of the reference signal based on the time domain index information and one or more of a sequence, a frequency domain resource that correspond to the reference signal.

11. The method according to claim 10, wherein the determining identification information based on the time domain index information and one or more of a sequence, a frequency domain resource that correspond to the reference signal comprises:
  determining sequence index information based on the sequence of the reference signal, determining frequency domain index information based on the frequency domain resource of the reference signal, or a combination thereof; and
  determining the identification information based on one or more of the sequence index information, the frequency domain index information, and the time domain index information.

12. The method according to claim 9, wherein
  the time domain resource comprises a first time domain resource and a second time domain resource;
  the identification information comprises first identification information and second identification information;
  the time domain index information comprises first time domain index information and second time domain index information; and
  the first time domain index information corresponds to the first identification information, and the second time domain index information corresponds to the second identification information; wherein the first time domain index information and the second time domain index information are used to distinguish different reference signal types.

13. A communications apparatus, comprising:
  at least one processor; and
  a memory storing programming instructions for execution by the at least one processor, the programming instructions instructing the communications apparatus to perform operations comprising:
  determining a period of a reference signal based on identification information, sequence indication information, and frequency domain indication information, wherein the identification information identifies a network device, the sequence indication information indicates one or more candidate sequences, and the frequency domain indication information indicates one or more candidate frequency domain resources;
  determining time domain index information corresponding to the identification information;
  determining a time domain resource of the reference signal that corresponds to the time domain index information in the period; and
  sending the reference signal on a transmission resource, wherein the transmission resource comprises a sequence, a frequency domain resource, and the time domain resource of the reference signal.

14. The apparatus according to claim 13, wherein the operations further comprises:
  determining, from the candidate sequences, the sequence of the reference signal corresponding to the identification information;
  determining, from the candidate frequency domain resources, the frequency domain resource corresponding to the identification information;
  determining the time domain resource based on the identification information; or
  a combination thereof.

15. The apparatus according to claim 14, wherein the determining, from the candidate sequences, the sequence of the reference signal corresponding to the identification information comprises:
  determining sequence index information corresponding to the identification information, and determining, from the candidate sequences, the sequence of the reference signal corresponding to the sequence index information.

16. The apparatus according to claim 15, wherein a value of a most significant bit in the sequence index information is determined by interference cancellation state indication information.

17. The apparatus according to claim 14, wherein the determining, from the candidate frequency domain resources, the frequency domain resource corresponding to the identification information comprises:
  determining frequency domain index information corresponding to the identification information, and determining, from the candidate frequency domain resources, the frequency domain resource corresponding to the frequency domain index information.

18. The apparatus according to claim 13, wherein the time domain resource is in one or more uplink-downlink switching periods;
  the time domain resource of the reference signal is determined further based on one or more of first indication information, second indication information, or third indication information;
  the first indication information indicates a quantity of times of repeatedly sending the reference signal;
  the second indication information indicates a position, of a symbol that carries the reference signal, in an uplink-downlink switching period; and
  the third indication information indicates an uplink-downlink switching period for carrying the reference signal and that is in a first uplink-downlink switching period and a second uplink-downlink switching period.

19. The apparatus according to claim 13, wherein the identification information comprises first identification information and second identification information; the time domain index information comprises first time domain index information and second time domain index information; and the first identification information corresponds to the first time domain index information, and the second identification information corresponds to the second time domain index information; wherein the first time domain index information and the second time domain index information distinguish different reference signal types.

20. The apparatus according to claim 19, wherein the time domain resource comprises a first time domain resource and a second time domain resource, and the determining the time domain resource of the reference signal that corresponds to the time domain index information in the period comprises:
  determining the first time domain resource in a first sub-period of the period based on the first time domain index information and a first offset, determining the second time domain resource in a second sub-period of the period based on the second time domain index information and a second offset, or a combination thereof;

wherein the period consists of the first sub-period and the second sub-period, the first offset is determined by the second sub-period, and the second offset is determined by the first sub-period.

21. A communications apparatus, comprising:

at least one processor; and a memory storing programming instructions for execution by the at least one processor, the programming instructions instructing the communications apparatus to perform operations comprising:

determining a receiving resource based on parameter information, wherein the parameter information comprises sequence indication information and frequency domain indication information, the sequence indication information indicates one or more candidate sequences, and the frequency domain indication information indicates one or more candidate frequency domain resources;

receiving a reference signal on the receiving resource;

determining a time domain resource of the reference signal in a period, wherein the period is associated with identification information, sequence indication information, and frequency domain indication information, the identification information identifies a network device that sends the reference signal;

determining time domain index information corresponding to the time domain resource of the reference signal; and determining the identification information based on the time domain index information.

22. The apparatus according to claim 21, wherein the operations further comprise:

determining one or more of a sequence, a frequency domain resource, and a time domain resource that correspond to the reference signal; and determining the identification information based on the time domain index information comprising:

determining the identification information of the reference signal based on the time domain index information and one or more of a sequence, a frequency domain resource that correspond to the reference signal.

23. The apparatus according to claim 22, wherein the determining identification information based on the time domain index information and one or more of a sequence, a frequency domain resource that correspond to the reference signal comprise:

determining sequence index information based on the sequence of the reference signal, determine frequency domain index information based on the frequency domain resource of the reference signal, or a combination thereof; and determining the identification information based on one or more of the sequence index information, the frequency domain index information, and the time domain index information.

24. The apparatus according to claim 21, wherein the time domain resource comprises a first time domain resource and a second time domain resource;

the identification information comprises first identification information and second identification information;

the time domain index information comprises first time domain index information and second time domain index information; and the first time domain index information corresponds to the first identification information, and the second time domain index information corresponds to the second identification information; wherein the first time domain index information and the second time domain index information are used to distinguish different reference signal types.

* * * * *